United States Patent
Al-Mufti et al.

(10) Patent No.: US 11,204,978 B2
(45) Date of Patent: Dec. 21, 2021

(54) COMPUTING STATISTICS FOR MIXTURE DISTRIBUTIONS

(71) Applicant: CommScope Technologies LLC, Hickory, NC (US)

(72) Inventors: Khalid W. Al-Mufti, Sterling, VA (US); Suryanarayana A. Kalenahalli, Chantilly, VA (US); Navin Srinivasan, Fairfax, VA (US); Ariful Hannan, Sterling, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/050,787

(22) PCT Filed: May 2, 2019

(86) PCT No.: PCT/US2019/030474
§ 371 (c)(1),
(2) Date: Oct. 26, 2020

(87) PCT Pub. No.: WO2019/221927
PCT Pub. Date: Nov. 21, 2019

(65) Prior Publication Data
US 2021/0049233 A1 Feb. 18, 2021

Related U.S. Application Data

(60) Provisional application No. 62/672,424, filed on May 16, 2018.

(51) Int. Cl.
*G06F 17/18* (2006.01)
(52) U.S. Cl.
CPC .................. *G06F 17/18* (2013.01)

(58) Field of Classification Search
CPC ........................................................ G06F 17/18
(Continued)

(56) References Cited

U.S. PATENT DOCUMENTS

2007/0038413 A1  2/2007  Mehta et al.
2016/0037550 A1  2/2016  Barabell et al.
(Continued)

FOREIGN PATENT DOCUMENTS

EP        2333980 A2    6/2011

OTHER PUBLICATIONS

Fenton, "The Sum of Log-Normal Probability Distributions in Scatter Transmission Systems", IRE Transactions on Communications Systems, Jun. 17, 1959, pp. 57 through 67.
(Continued)

*Primary Examiner* — Tan V Mai
(74) *Attorney, Agent, or Firm* — Fogg & Powers LLC

(57) ABSTRACT

A computing device includes a processor and memory storing instructions that are executable to determine a median of a first mixture distribution. The instructions are also executable to determine a parent mean, a parent standard deviation, and boundaries for each of multiple segments in the first mixture distribution. The instructions are also executable to determine a segment mean and a segment second moment for each segment based on the parent mean, the parent standard deviation, and the boundaries for the respective segment. The instructions are also executable to determine a scaled probability for each segment. The instructions are also executable to determine a mixture mean and a mixture standard deviation for the first mixture distribution based on the segment mean, the segment second moment, and the scaled probability for each segment in the first mixture distribution.

20 Claims, 9 Drawing Sheets

(58) Field of Classification Search
USPC .......................................................... 708/806
See application file for complete search history.

(56) References Cited

U.S. PATENT DOCUMENTS

2016/0316377 A1   10/2016   Hooey
2018/0070254 A1   3/2018   Hannan et al.

OTHER PUBLICATIONS

Hufford, "The ITS Irregular Terrain Model, version 1.2.2 The Algorithm", National Telecommunications and Information Administration, at least as early as Jan. 28, 1999, pp. 1 through 18, Institute for Telecommunication Sciences.
International Searching Authority, "International Search Report and Written Opinion from PCT Application No. PCT/US2019/030474", dated Aug. 12, 2019, pp. 1 through 9, Published: WO.
Johnson et al., "Continuous Univariate Distributions, vol. 1", Second Edition, Wiley Series in Probability and Mathematical Statistics, 1994, pp. 1 through 19, A Wiley-Interscience Publication, ISBN 0-471-58495-9.
Platt, "Mean and Variance of "Piecewise" Normal Distribution", Aug. 5, 2014, pp. 1 through 4, https://math.stackexchange.com/questions/888151/mean-and-variance-of-piecewise-normal-... May 7, 2018.
Soderlind, "Lecture Notes—Econometrics: Some Statistics", University of St. Gallen, Jul. 8, 2013, pp. 1 through 25.
Wif, "Requirements for Commerical Operation in the U.S. 3550-3700 MHz Citizens Broadband Radio Service Band", Working Documents WINNF-TS-0112, Version V1.4.1, Jan. 16, 2018, pp. 1 through 77, The Software Defined Radio Forum Inc.

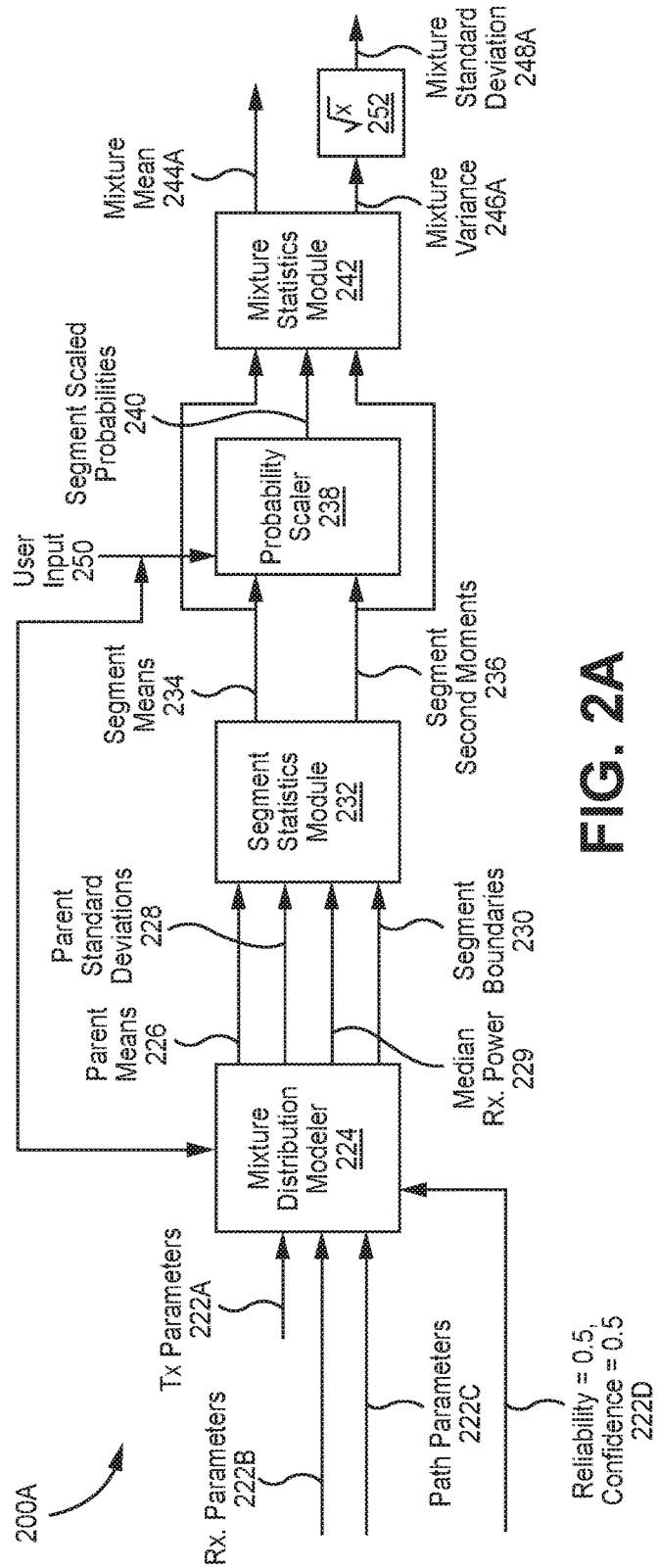
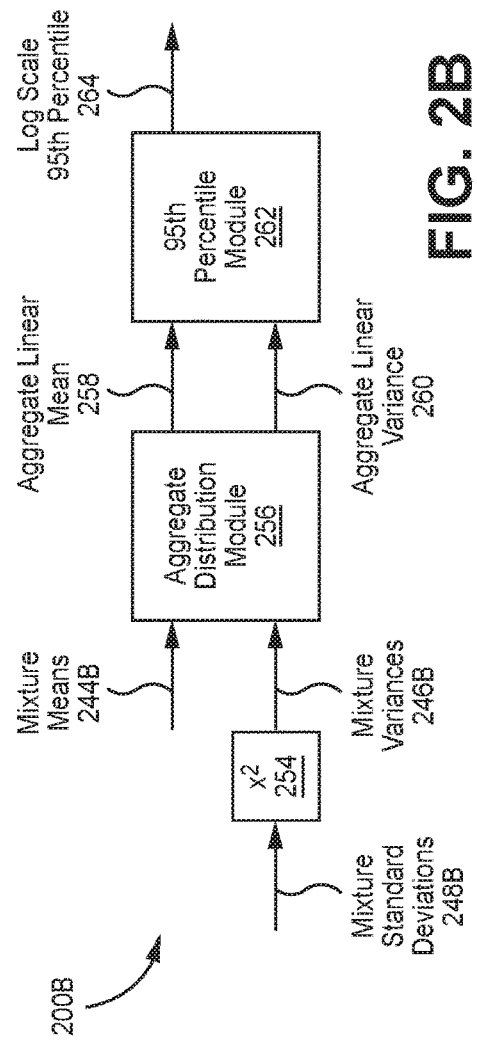

COMPUTING STATISTICS FOR MIXTURE DISTRIBUTIONS

CROSS-REFERENCE TO RELATED APPLICATIONS

This application claims priority International Application No. PCT/US2019/030474 filed on May 2, 2019 and titled "COMPUTING STATISTICS FOR MIXTURE DISTRIBUTIONS," which claims priority to U.S. Provisional Patent Application Ser. No. 62/672,424 filed on May 16, 2018 and titled "COMPUTING STATISTICS FOR MIXTURE DISTRIBUTIONS", the contents of both of which are incorporated in their entirety herein by reference.

BACKGROUND

Statistics of mixture probability distributions are typically computed using sample mean and variance from a population of random samples of a mixture distribution. The higher the number of samples, the more accurate the estimated mean and variance of the mixture distribution. However, in practical computing systems, large sample populations for a large number of distributions can increase memory and computation overhead. Furthermore, when computing the mean of the sum of a plurality of distributions, individual mean and variance errors can accumulate, thus leading to an inaccurate aggregate mean and variance computation.

Accurately computing mean and variance of each distribution, while minimizing memory and computation overhead, may be desirable for modeling systems that compute aggregate interference modeled by the Irregular Terrain Model (ITM) path loss model, which has a mixture distribution path loss variation. Accordingly, the present systems and method describe accurate and computationally-efficient ways to compute statistics for mixture distributions.

SUMMARY

A computing device for computing statistics for a first mixture distribution is provided. The computing device includes a processor and memory storing instructions. The instructions are executable to determine a median of the first mixture distribution. The instructions are also executable to determine a parent mean, a parent standard deviation, and boundaries for each of multiple segments in the first mixture distribution. The instructions are also executable to determine a segment mean and a segment second moment for each segment based on the parent mean, the parent standard deviation, and the boundaries for the respective segment. The instructions are also executable to determine a scaled probability for each segment. The instructions are also executable to determine a mixture mean and a mixture standard deviation for the first mixture distribution based on the segment mean, the segment second moment, and the scaled probability for each segment in the first mixture distribution.

DRAWINGS

Understanding that the drawings depict only exemplary configurations and are not therefore to be considered limiting in scope, the exemplary configurations will be described with additional specificity and detail through the use of the accompanying drawings, in which:

FIG. 2A illustrates a system for computing statistics of a mixture distribution;

FIG. 2B is a block diagram illustrating a system for determining statistics of an aggregate distribution;

Figure 1:
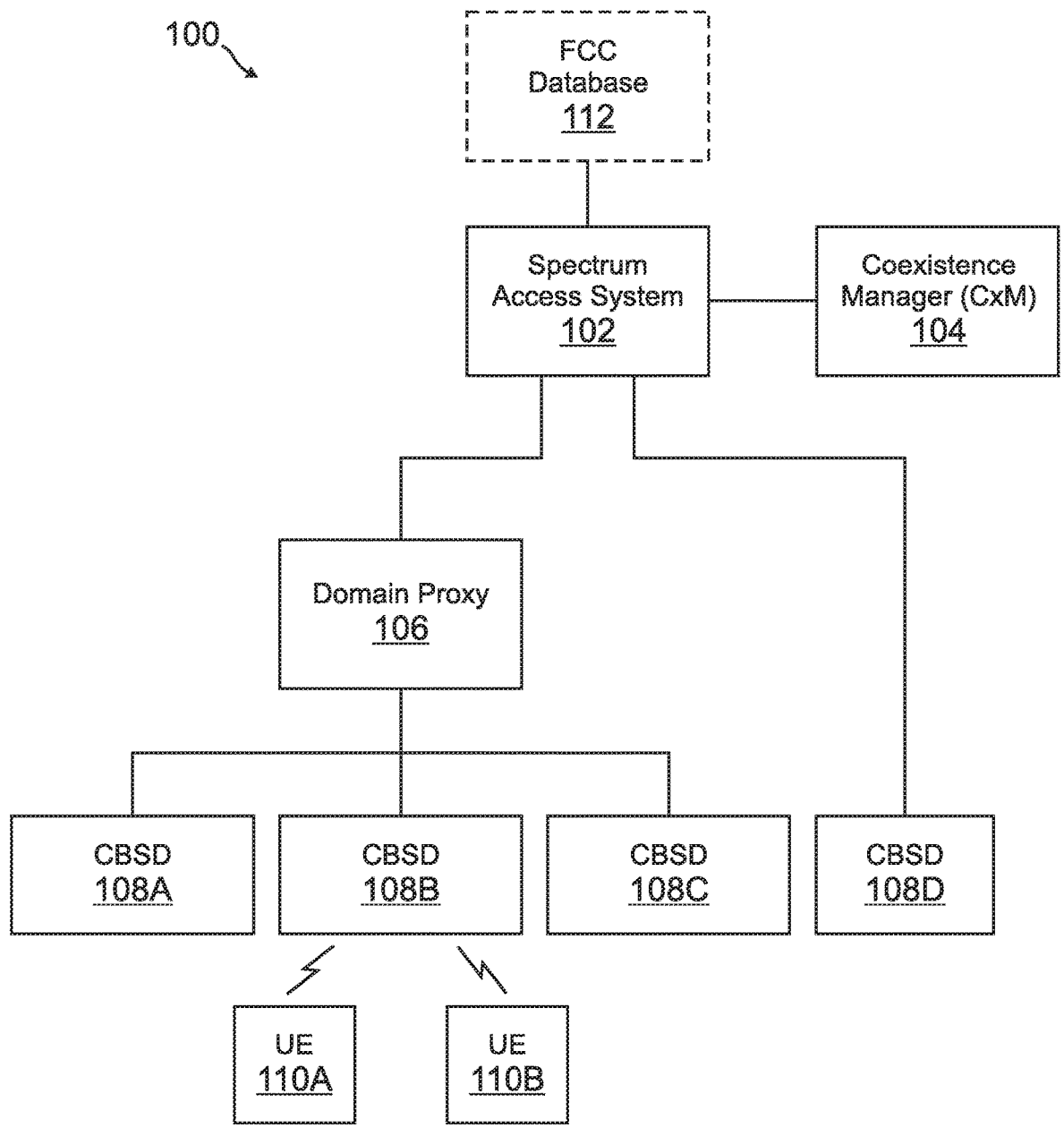
FIG. 1 is a block diagram illustrating an example system for computing statistics for mixture distributions.

In accordance with common practice, the various described features are not drawn to scale but are drawn to emphasize specific features relevant to the exemplary configurations.

DETAILED DESCRIPTION

An Irregular Terrain Model (ITM) model may be used to model path loss from a transmitter at a distance from a receiver. The statistics of path loss variation may be translated to a variation of received power that the receiver will measure over a window of time. This may produce a distribution of received power that may follow a normal, or Gaussian, distribution (if the measurements are viewed in a logarithmic scale). Additionally, the ITM model may incorporate empirical corrections to the observed power variation, which may result in a mixture distribution (MD). In other words, the ITM model may produce a mixture distribution that includes multiple segments, each segment following a normal distribution with a different mean and variance, i.e., the mixture distribution is a mixture of multiple normal distributions, each with a different shape.

In wireless systems, it may be useful to calculate aggregate mean and aggregate variance of the aggregate interference from a set of transmitters, i.e., as measured at a single receiver. Additionally, the 95th percentile of the aggregate interference (e.g., based on the aggregate mean and aggregate variance) may be useful in various applications.

A sampling scheme may be used to determine such statistics, e.g., the Monte Carlo scheme described in Wireless Innovation Forum (WInnForum) Working Document WinnF-TS-0112 v1.4.1. For example, this Monte Carlo technique may randomly sample received power values that represent probabilities (in a cumulative probability function) from the 0.1th percentile to the 99.9th percentile, then provide the samples as an impulse to the ITM model in order to produce a Monte Carlo trial per transmitter. Therefore, the Monte Carlo approach may store a mixture distribution for each transmitter, then sum the sampled received power values to produce an aggregated interference for the system (and associated statistics, such as mean, variance, and/or 95th percentile). However, if a wireless system includes hundreds or thousands of transmitters and receivers (e.g., each measuring 2,000 samples), the computation and memory requirements to calculate statistics for mixture distributions in the wireless system can be burdensome, even for cloud-based processing. Accordingly, there is a need to calculate statistics for mixture distributions in a way that is less computationally-intensive and resource-intensive, i.e., without using the Monte Carlo approach.

Therefore, the present systems and methods describe a computerized, computational method to determine a mean and variance of mixture distributions (MDs) using scaled probability measures, the first moment (mean) and second moment of segments (truncations) that are part of the MD(s). The computational method may use a set of statistical parameters corresponding to each segment (instead of the raw power measurement samples) of the MD as input. The computational method may then use truncated statistics methods to compute an individual mean and variance of each segment of the MD. The statistics of the segments of the mixture distribution are then combined to compute the statistics of the MD.

For a set of N independent MDs, the mean and variance of the aggregate of N MDs may be computed, according to the present systems and methods, using the central limit theorem to compute a percentile of the aggregate distribution, e.g. 95th percentile.

Additionally, the scaled probability feature of the present systems and methods allows for user-defined upper and lower limits on the parent distribution, such that the mixture distribution statistics are accurately computed independent of the specified parent distribution bounds.

It is understood that the teachings herein are applicable to any statistical applications where a mixture distribution characterizes variation of a random variable for which the mixture distribution's mean and variance need to be determined. If the random variable is lognormally distributed, then the mean of aggregate, variance of aggregate, 95th percentile, or any other percentile of aggregate distribution, can additionally be determined as described below.

More specifically, the present systems and methods may be used in applications that model path loss variation using the ITM model, thus requiring determination of path loss mixture distributions to determine aggregate interference statistics, e.g., mean and variance. For such use cases, the present systems and methods may reduce memory, computational load and variations in the results due to use of Monte Carlo trials. Such use cases can include (1) frequency planning tools where interference is modeled with ITM; or (2) cognitive radio networks, where transceiver nodes need to model interference based on an ITM model and allocate power to transmitters on a shared spectrum.

For example, a spectrum access system (SAS) in a Citizens Broadband Radio Service (CBRS) system may utilize the present systems and methods to deal with interference power variation, modeled by ITM, for which a mean, or 95th percentile, or any other percentile, of aggregate interference power needs to be determined. This may include protecting Tier 2 operators (Priority Access Licensees (PAL)) from Tier 3 (GAA) interference, where ITM modeling is used to determine interference from one or more Citizens Broadband Radio Service devices (CBSDs) to a point within a protection area. This may also include protecting Tier 3 operators (GAA) from Tier 3 (GAA) interference, where ITM modeling is used to determine interference from one or more Citizens Broadband Radio Service devices (CBSDs) to a point within a protection area. This may also include protecting Tier 2 operators (PAL) from Tier 2 (PAL) and Tier 3 (GAA) interference, e.g., where ITM modeling is used to determine interference from one or more Citizens Broadband Radio Service devices (CBSDs) to a point within a protection area.

Furthermore, the 95th percentile computation described herein may be used to determine a set of secondary users (i.e., Priority Access Licensees (PAL) and General Authorized Access (GAA) users) to remove from the channel (Move-List) such that a radar receiver is protected from aggregate interference of CBSDs in the full 360 degree view of the radar receiver.

Therefore, the present systems and methods provide an improvement to the field of computing statistics for mixture distributions, i.e., they produce more accurate statistics (i.e., with less variation) than other approaches for computing statistics for mixture distributions, such as the Monte Carlo approach. Furthermore, the present systems and methods improve the functioning of a computing device because it uses less processing and memory resources when computing statistics of mixture distributions compared to other approaches, e.g., the Monte Carlo approach.

When applied to path loss (or interference) modeling in a wireless system, the present systems and methods may result in more accurate (i.e., with less variation) path loss (or interference) modeling, which may result in more efficient spectrum allocation, i.e., allocating spectrum within the wireless system in a way that minimizes interference, and therefore, allows devices in the system to use lower transmit power (resulting in longer battery life). Efficient spectrum allocation may also reduce dropped calls in the wireless system as a result of lower interference. Better path loss (or interference) modeling may also enable a wireless system to protect certain high priority users (e.g., Tier 1 users) from interference from lower priority users (e.g., Tier 2 and Tier 3 users). If used to model path loss (or interference) in a wireless system, the present systems and methods may also reduce the processing and memory demands required by a computing device (e.g., a SAS) modeling path loss in the wireless system compared to other approaches, thus enabling cheaper infrastructure to be deployed in wireless systems.

FIG. 1 is a block diagram illustrating an example system 100 for computing statistics for mixture distributions. The system 100 may be a Citizens Broadband Radio Service (CBRS) system that includes a spectrum access system (SAS) 102, a CBRS coexistence manager (CxM) 104, one or more Citizens Broadband Radio Service devices (CBSDs) 108A-D, and one or more user equipments (UEs) 110A-B. The devices in the system 100 may be capable of transmitting and receiving in the entire 3.5 GHz band, even if they are not deployed in that manner.

The SAS 102 may be an FCC-mandated function that allocates unlicensed spectrum in a geographical area. The SAS 102 may be implemented with one or more processors in one or more physical devices. The SAS 102 may optionally be coupled to an FCC database 112 that includes data used by the SAS 102 during spectrum allocation. The SAS 102 may limit the maximum power of CBSDs 108 to perform interference mitigation between tiers. The SAS 102 may also remove CBSD(s) 108 from a communication channel, i.e., the SAS 102 may instruct CBSD(s) 108 to cease (or prevent CBSD(s) 108 from) transmitting on a particular RF communication channel (or frequency) for at least a period of time.

Since the CBRS band is open spectrum, it can be used by different devices operating according to different wireless protocols, e.g., CBRS devices, Wireless Internet Service Providers Association (WISPA) devices, Wi-Fi devices, etc.

In order to enable coexistence between various devices (CBRS or otherwise) using CBRS spectrum in the system 100, the SAS 102 may allocate the CBRS spectrum in a way that protects users from lower levels. For example, when an incumbent (Tier 1) licensee transmits, the SAS 102 may prevent lower-tiered users, such as Priority Access Licensees (PAL) and General Authorized Access (GAA) operators, from transmitting. The SAS 102 may receive data from a network of Environmental Sensing Capability (ESC) sensors (not shown) that detects incumbent (and/or other) transmissions.

CBSDs 108 operating in the CBRS band may be required to register with the SAS 102 and provide their location and other details to the SAS 102. The SAS 102 may then allocate a set of RF channels that the PAL and GAA users can access.

Each CBSD 108 may be a device that provides wireless (e.g., Long Term Evolution (LTE)) service to one or more user equipments (UEs) 110 in a surrounding geographical area. The CBSDs 108 may alternatively be referred to as "enhanced Node Bs," "eNBs," "small cells," radio service devices," etc. In one configuration, the CBSDs 108A-C may be coupled to the SAS 102 via a domain proxy 106. Alternatively, a CBSD 108D may be coupled to the SAS 102 without an intervening domain proxy 106. Alternatively, the CBSDs 108 may be coupled to the CxM 104 directly. In any case, the CBSDs 108 may be communicatively coupled to the SAS 102 and/or CxM 104, e.g., using one or more Ethernet connections. The CBSDs 108 may be PAL and/or GAA users.

The UEs 110 may be mobile end user terminals, and may also referred to as handsets, smartphones, cell phones, access terminals, wireless communication devices, mobile devices, etc. The UEs 110 may be LTE UEs that are additionally certified by the CBRS Alliance. The UEs 110 may wait for authorization from a nearby CBSD 108 before transmitting in the CBRS band.

The CxM 104 may manage the interference between the deployed devices (e.g., the CBSDs 108) by advising the SAS 102 about channel allocation. The CxM 104 may be implemented as a component of the SAS 102 or a separate physical device that is coupled to the SAS 102, e.g., by an Ethernet connection.

The SAS 102 and the CxM 104 may cooperatively allocate spectrum to the CBSDs 108 in the system 100. Specifically, the SAS 102 may allocate a chunk of spectrum (i.e., a set of radio frequency (RF) channels) to the CxM 104, e.g., based on input from the CxM 104. The CxM 104 may then sub-allocate the spectrum among the CBSDs 108. Therefore, the CBSDs 108 may provide wireless service to the UEs 110 using one or more of the RF channels allocated thereto by the CxM 104. Alternatively, the SAS 102 may allocate the individual RF channels directly to the CBSDs 108.

In order to allocate spectrum in the system 100, the SAS 102 may model interference experienced at one or more protection points in the system 100. Each protection point may be a geographic location (or area) for which received power variation is modeled, e.g., as a uniformly distributed random variable. The received signal power modeled for each protection point may represent LTE co-channel interference and LTE other-channel interference, and/or non-LTE interference, such as 5G interference, Wi-Fi interference, etc. The interfering transmitters may be ESC sensors, CBSDs 108, UEs 110, Wireless Internet Service Providers Association (WISPA) devices, Wi-Fi devices, etc. In some examples, a protection point may represent a geographic location (or area) for which interference analysis is conducted by the SAS 102 using transmitter model(s), receive model(s), and path parameters.

The SAS 102 may model a separate mixture distribution for each transmitter that is received at a protection point, e.g., using an ITM model. The ITM model may be a predetermined software model that is generated using empirically-determined distribution parameters (e.g., mean and/or standard deviation) for each segment and the segment boundaries.

Using the ITM model, the SAS 102 may simulate, without receiving actual power measurement, the pathloss variation at a particular protection point. In other words, the SAS 102 may model, using the ITM model, the received power (e.g., from many surrounding transmitters) at a hypothetical receiver located at a protection point without actually measuring a population of samples. Rather, the shape of the segments in the modeled mixture distributions may be determined based on transmitter parameters for a transmitter (e.g., a CBSD 108), receiver parameters at a protection point, path parameters, a reliability value (e.g., 0.5) and a confidence value (e.g., 0.5) that are input into the ITM model. The output of the ITM model may be referred to as a receive power (e.g., "median receive power"), however, it is understood that such values are outputs of a model, and not actually measured. Therefore, modeling a mixture distribution may include producing statistics (a parent mean, a parent standard deviation, a median receive power, and segment boundaries) for each segment in the mixture distribution as a function of the input parameters (not a population of samples) to an ITM model.

The SAS 102 may model a separate mixture distribution per transmitter using the computed received power (at the protection point) for the respective transmitter. In other words, the SAS 102 may model a mixture distribution for every transmitter measured that would be seen at every protection point. Therefore, if a particular transmitter is within range of two protection points (i.e., two different protection points are within detectable range of the same particular transmitter during a window of time), the SAS 102 may model two different mixture distributions for the particular transmitter, where each mixture distribution differs due to the different propagation paths from the particular transmitter to the protection points (and transmission parameters that may affect the power received at the different protection points).

The SAS 102 may also determine statistics (e.g., an aggregate mean and an aggregate variance) of each mixture distribution using the statistics of each segment (e.g., segment means and segment second moments) in the respective mixture distribution. Additionally, the mixture distributions for the transmitters may be aggregated into an aggregated distribution. Then, a 95th percentile of the aggregate distribution may be determined, e.g., based on an aggregate mean and an aggregate variance of the aggregate distribution. An aggregate distribution may be determined at a protection point using the mixture distributions for all transmitters detected at the protection point.

FIG. 2A illustrates a system 200A for computing statistics of a mixture distribution. The system 200A may be implemented using one or more processors executing instructions stored in memory. For example, the system 200A may be a SAS 102 in a CBRS system 100. However, the system 200A may be any computing device (or combination of computing devices) that determines a mixture distribution characterizing variation of a random variable for which the mixture distribution's mean and variance need to be determined.

Input parameters may be passed into passed into a mixture distribution modeler 224. Specifically, the input parameters may include transmitter parameters 222a for a CBSD 108, receiver parameters 222b at a protection point, path parameters 222c along with reliability and confidence values, e.g., both set to 0.5. The computed median received power 229 may be for a single CBSD 108 transmission link to a single protection point. The mixture distribution modeler 224 may model a mixture distribution (i.e., produce a parent mean 226, a parent standard deviation 228, a median receive power 229, and segment boundaries 230 for each segment in the mixture distribution as a function of the input parameters) using an ITM model. The ITM model may be implemented in software, hardware, or a combination of software and hardware.

The transmitter parameters 222A may include the following information:

TABLE 1

Transmitter Parameters

| Field | Units | Description |
| --- | --- | --- |
| Latitude/Longitude | Degrees, minutes, seconds | Location of the transmitter |
| Equivalent Isotropically Radiated Power (EIRP) | dBm per MHz | Transmit (i.e., Radiated) Power |
| Antenna height | Meters | Height of the transmit antenna |
| Antenna Azimuth | Degrees | Azimuth of the transmit antenna |
| Center frequency | MHz | Frequency of transmission centered around the requested bandwidth |
| Transmitter filter mask | dB | Transmitter output filter response specified at various frequency points in dB/KHz |
| Antenna pattern | dB | Transmit antenna gain versus angle relative to antenna azimuth |

The receiver parameters 222B may include the following information:

TABLE 2

Receiver Parameters

| Field | Units | Comments |
| --- | --- | --- |
| Latitude/Longitude | Degrees, minutes, seconds | Location of the receiver |
| Center frequency | MHz | Center-frequency together with the upper and lower edge define the pass-band of the receiver |
| Receiver filter mask | dB | Receiver output filter response specified at various frequency points in dB/KHz |
| Antenna height | Meters | Height of the receiver antenna |
| Antenna pattern | dB | Receive antenna gain versus angle relative to antenna azimuth |
| Antenna Azimuth | Degrees | Azimuth of the receiver antenna |

The path parameters 222C may include latitudes and longitudes of points along the path between the transmitter and receiver at certain resolution (30 m in this case), and the elevation at each of these points along the path. The path parameters 222C may also include climate parameters, e.g., discussed below.

The input parameters may also include reliability and confidence parameters. The reliability value of 0.5 may be a quantile of the receive power variation, e.g., a 0.5 reliability value input may output the median receive power 229. The confidence value may be a percentage value that is user set to provide confidence in the prediction of the path loss. Higher confidence user setting may result in an ITM model returning more path loss, which means less coverage for an RF link, meaning more conservative estimate of coverage for the link. A confidence value of 0.5 may also be used, which is neutral confidence (not over conservative or under conservative).

The mixture distribution modeler 224 may also receive user input 250 that includes an indication of the bounds of the mixture distribution that the user is interested in, e.g., 0.1th percent to 99.9th percent. This input may then affect the segment boundaries 230 output by the mixture distribution modeler 224.

Figure 3:
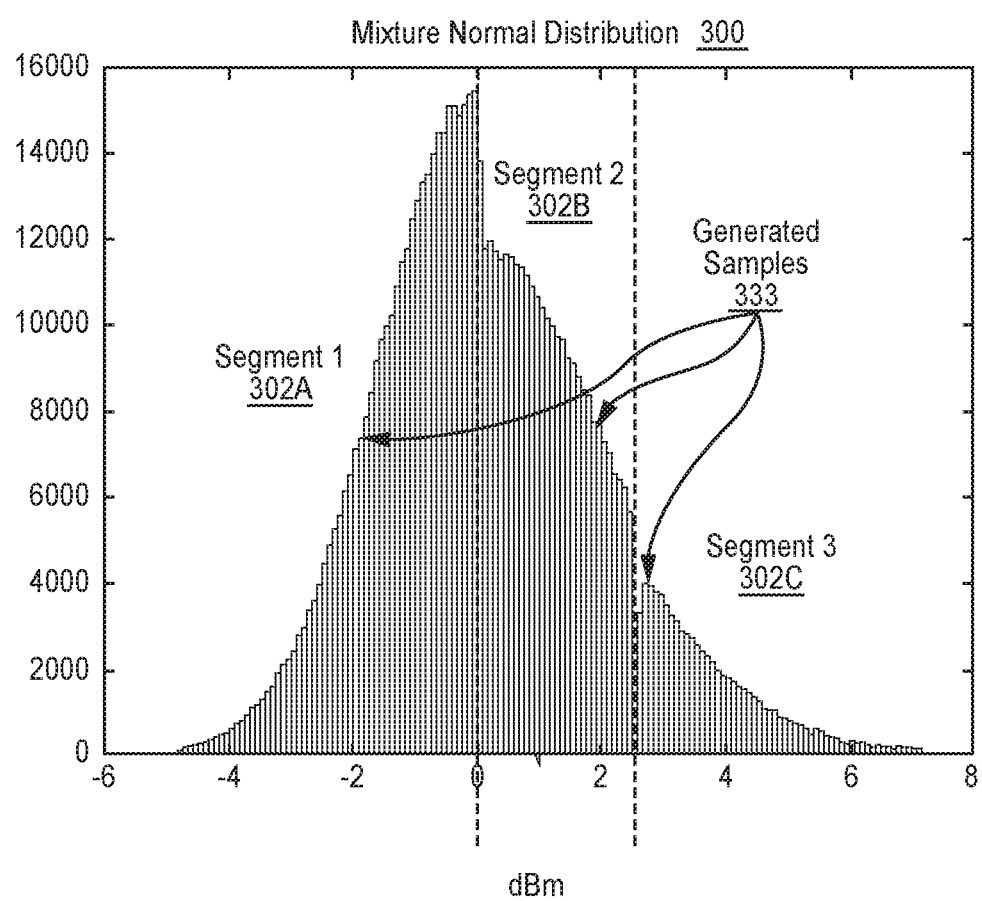
FIG. 3 is a log-scale distribution illustrating an example mixture normal distribution that includes three segments.

FIG. 3 is a log-scale distribution illustrating an example mixture normal distribution 300 that includes three segments 302A-C. For example, the example mixture normal distribution 300 illustrated in FIG. 3 may be a generated by a Monte Carlo simulation. It should be noted that, in some configurations, the mixture distribution modeler 224 may not model entire mixture normal distributions 300.

The mixture normal distribution 300 may be a probability log-scale distribution including multiple segments 302, each segment having a different mean and/or variance. Each segment 302 may be a portion of a parent distribution (e.g., normal distribution) where each parent distribution has a different shape caused by its mean and variance. Because each parent distribution has a different mean and/or variance, the mixture normal distribution 300 may be disjoint at segment 302 transitions. The mixture normal distribution 300 may include more or less than three segments 302, e.g., two, four, etc.

The mean of the first segment 302A, the second segment 302B, and the third segment 302C may be represented as $\mu_1$, $\mu_2$, and $\mu_3$, respectively. The standard deviation of the first segment 302A, the second segment 302B, and the third segment 302C may be represented as $\sigma_1$, $\sigma_2$, and $\sigma_3$, respectively. The variance of the first segment 302A, the second segment 302B, and the third segment 302C may be represented as $\sigma_1^2$, $\sigma_2^2$, and $\sigma_3^2$, respectively. The boundary between the first segment 302A and the second segment 302B may occur at the median receive power 229.

The mixture normal distribution 300 may be thought of as a distribution of a random variable X. The mixture normal distribution 300 may illustrate the distribution of received power from a particular transmitter in a CBRS system 100, i.e., based on generated or computed (not measured) receive power samples 333. For example, the mixture normal distribution 300 may result if the mixture distribution modeler 224 were to output a receive power value across the entire range of reliability values 222D. It should be noted, however, that the mixture distribution modeler 224 may produce only one output in some configurations, i.e., using 0.5 as a reliability value 222D as input to determine the median receive power 229.

The example of a Monte-Carlo-simulation-generated mixture normal distribution 300 illustrated in FIG. 3 may be in log-scale in order to compress a large variation of generated receive power samples 333 of received power into a single distribution. Therefore, the x axis of the mixture normal distribution 300 may represent decibels (dB) from the median receive power 229, in dBm, (i.e., power variation), which may also map to percentiles of a corresponding cumulative probability function. For example, 0 dBm on the x axis may map to 50% (or 0.5) in a cumulative probability function, i.e., 50% of the generated receive power samples 333 for the transmitter are below 0 dBm. Similarly, −4 dBm on the x axis may map to approximately 5% (or 0.05) in a cumulative probability function, i.e., approximately 5% of the received power generated receive power samples 333 for the transmitter are below −4 dBm. Similarly, 2 dBm on the x axis may map to approximately 75% (or 0.75) in a cumulative probability function, i.e., approximately 75% of the received power for the transmitter are below 2 dBm.

The y axis of the mixture normal distribution 300 may represent the number of generated receive power samples 333 for a particular power variation bin, e.g., approximately 6,000 samples of receive power 333 were generated for a particular transmitter that were approximately −2 dB away from the median receive power 229 for the particular transmitter, as illustrated in FIG. 3. Similarly, approximately 2,000 generated power samples 333 were received for the particular transmitter that were approximately 4 dB away from the median received power 229 for the particular transmitter, as illustrated in FIG. 3.

Figure 4:
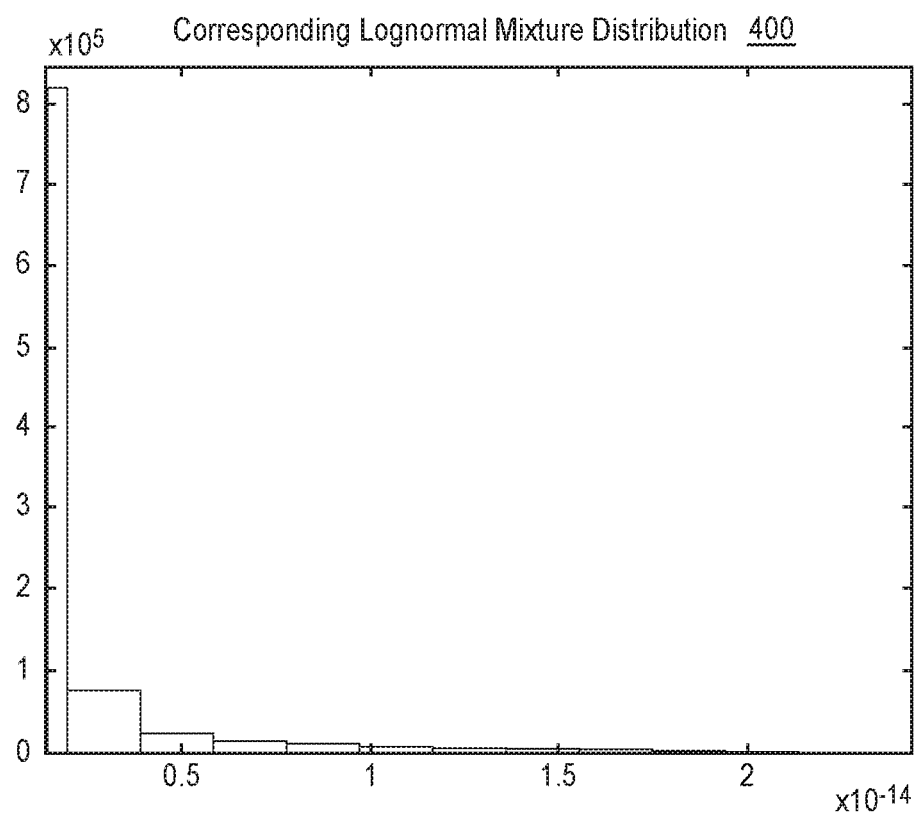
FIG. 4 is a probability density function illustrating an example lognormal mixture distribution corresponding to the mixture distribution illustrated in FIG. 3.

FIG. 4 is a probability density function illustrating an example lognormal mixture distribution 400 corresponding to the mixture distribution 300 illustrated in FIG. 3. The ITM model may output in the log-scale. However, various processing may occur in the linear scale. Therefore, the mixture normal distribution 300 illustrated in FIG. 3 may be converted to the linear scale, i.e., producing a corresponding lognormal mixture distribution 400. If a random variable X is normally distributed (as illustrated in FIG. 3) with mean $\mu$ and standard deviation $\sigma$ (i.e., $X \sim N(\mu,\sigma)$), then $Y=e^X$ may be the corresponding lognormal distribution 400 (e.g., as illustrated in FIG. 4). Since the reverse relationship is $X=\log_e(Y)$, we refer to X as being in log, or logarithmic, scale (e.g., in FIG. 3) and Y as being in the linear scale (e.g., in FIG. 4).

The x axis of the lognormal mixture distribution 400 may be in a linear scale, e.g., units of milliwatts (mW). For example, 0 dBm on the x axis of the mixture normal distribution 300 illustrated in FIG. 3 may correspond to 1 mW on the x axis of the lognormal mixture distribution 400. The y axis may of the lognormal mixture distribution 400 be number of samples in a particular bin. For example, the lognormal mixture distribution 400 illustrates approximately $8.2 \times 10^5$ generated random receive power samples 333 for a particular transmitter with values in the first bin (i.e., approximately 0-0.1 mW). Similarly, the lognormal mixture distribution 400 illustrates approximately $0.8 \times 10^5$ generated random receive power samples 333 for the particular transmitter with values in the second bin (i.e., approximately 0.1-0.35 mW). The specific bin values are merely used for illustration, and any suitable binning of generated random receive power samples 333 may be used. Similarly, the lognormal mixture distribution 400 illustrates approximately $0.2 \times 10^5$ generated random receive power samples 333 for the particular transmitter with values in the third bin (i.e., approximately 0.35-0.6 mW).

The lognormal mixture distribution 400 illustrated in FIG. 4 is merely exemplary and the specific values do not necessarily correspond to the specific values in the mixture normal distribution 300 illustrated in FIG. 3.

Figure 5:
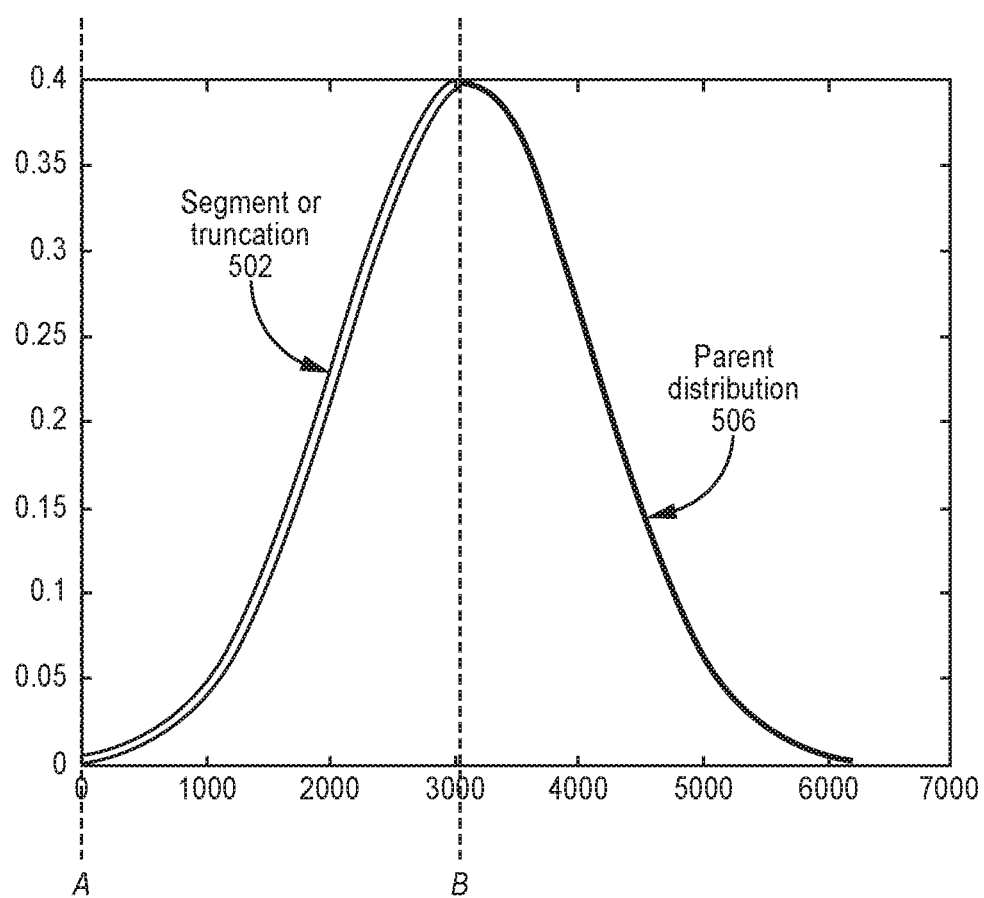
FIG. 5 is a distribution illustrating an example parent distribution and a segment of the parent distribution.

As used herein, the term "mixture distribution" refers to a distribution of a random variable X (e.g., generated random receive power samples 333) that includes multiple segments 302, each with different means and/or variances. A mixture distribution can be represented in various ways, such as a log-scale representation (e.g., the mixture normal distribution 300 in FIG. 3), a corresponding cumulative probability function representation, a corresponding probability density function representation, linear-scale lognormal representation (e.g., the lognormal mixture distribution 400 in FIG. 4), etc. Accordingly, unless otherwise specified, the term "mixture distribution" refers to the underlying distribution of a random variable, and may refer to a log-scale representation, a corresponding cumulative probability function representation, a corresponding probability density function representation, or a linear-scale lognormal representation, depending on the context. Similarly, the term "segment" refers to a portion of a mixture distribution, and may refer to a log-scale representation, a corresponding cumulative probability function representation, a corresponding probability density function representation, or a linear-scale lognormal representation, depending on the context FIG. 5 is a distribution illustrating an example parent distribution 506 and a segment 502 of the parent distribution 506. The parent distribution 506 may be the complete distribution from which segments (or truncations) 502 are derived. Therefore, distributions Y (e.g., in FIG. 4) and X (e.g., in FIG. 3), are parent distributions 506, and their means and variances are parent means and parent variances. As an example, $\mu$ and $\sigma$ are the parent mean and standard deviation of X, respectively, and m and v are parent mean and parent variance of Y, respectively.

For example, each segment 302 in the example mixture normal distribution 300 illustrated in FIG. 3 may have a corresponding parent distribution 506 with a parent mean and a parent variance.

The x axis illustrated in FIG. 5 may be a value of a random variable with mean roughly equal to 3,100, which is where the bell curve peaks. The y axis illustrated in FIG. 5 may be the probability measure such that if we integrate the area under the entire curve the result will be 1. The parent distribution 506 illustrated in FIG. 5 is merely exemplary and the specific values do not necessarily correspond to the specific values in the mixture normal distribution 300 illustrated in FIG. 3 or the specific values in the lognormal mixture distribution 400 illustrated in FIG. 4.

Referring back to FIG. 2A, the mixture distribution modeler 224 may output parent statistics (i.e., a parent mean 226 and a parent standard deviation 228) as a function of transmitter parameters 222A, receiver parameters 222B, and path parameters 222C for each segment 302 in a mixture distribution 300. In some configurations, segment boundaries 230 may also be output by the mixture distribution modeler 224 for one or more segments 302.

The segment boundaries 230 may be output in terms of percentiles (e.g., in a corresponding cumulative probability function) and other output parameters from an ITM model, e.g., ZD. For example, the lower boundary 230 of the first segment 302A (i.e., the left side of median) may be determined as medRxPwrdBm+sigmaTminusdB*qfuncinv(b), where medRxPwrdBm is the median received power 229; sigmaTminusdB is the standard deviation of the parent normal distribution 506, with zero mean and standard deviation sigmaTminusdB, of the first segment 302A; and qfuncinv(b) is the inverse Q function of the standard normally distributed random variable with probability b. In other words, the lower boundary 230 of first segment 302A may be a scaled and shifted value of the standard normally distributed random variable with probability b (e.g., set to 0.999), i.e., scaled by multiplication with sigmaTminusdB and shifted by the median receive power (medRxPwrdBm) 229. For example, $Q^{-1}(0.999)=-3.09$, which may be a value on the left tail, or edge, of the standard normal bell curve.

It should be noted that sigmaTminusdB may be an output parameter from the ITM model implemented in the mixture distribution modeler 224. The upper boundary 230 of the first segment 302A may be the median received power (medRxPwrdBm) 229.

The lower boundary 230 of the second segment 302B may be the median received power (medRxPwrdBm) 229. The upper boundary 230 of the second segment 302B may be determined as medRxPwrdBm+zDdB*sigmaTplusdB, where zDdB is a climate-dependent distribution segment boundary scaler; and sigmaTplusdB is the standard deviation of the parent normal distribution 506, with zero mean and standard deviation sigmaTplusdB, of the second segment 302B. In other words, the upper boundary 230 of the second segment 302B may be determined as the product of zDdB and sigmaTplusdB shifted by the (medRxPwrdBm) 229. zDdB and sigmaTplusdB may be output parameters from the ITM model implemented in the mixture distribution modeler 224.

The lower boundary 230 of the third segment 302C may be determined as medRxPwrdBm+(zDdB.*sigmaTddB+tgtdB), where sigmaTddB is a third segment lower boundary scaler; and tgtdB is the mean of the parent normal distribution 506, with mean tgtdB and standard deviation sigmaTddB, of the third segment 302C. Both sigmaTddB and tgtdB may be output parameter from the ITM model implemented in the mixture distribution modeler 224. The upper boundary 230 of the third segment 302C may be determined as medRxPwrdBm+sigmaTddB*qfuncinv(a)+tgtdB, where qfuncinv(a) is the inverse Q function of the standard normally distributed random variable with probability a. In other words, the upper boundary 230 of the third segment 302C may be determined as the value of the normally distributed random variable with probability a (e.g., set to 0.001), scaled by sigmaTddB and shifted by tgtdB and medRxPwrdBm values. For example, $Q^{-1}(0.001)=3.09$, which may be a value on the right tail, or edge, of the standard normal bell curve.

Optionally, the system 200A may perform a check on the segment boundaries 230 (e.g., A and B in FIG. 5) and determine if they exceed the defined limits of the parent distribution 506. If so, the system 200A may limit the segment boundaries 230 to be slightly less than the parent distribution 506 bounds. For example, by adding to the lower bound (e.g., A in FIG. 5) a value equal to a small quantile (e.g. 0.0001) or by subtracting from the upper bound (e.g., B in FIG. 5) a small quantile (e.g. 0.0001). This may ensure that segment 302 statistics are computed correctly. This may be especially important when using the ITM propagation model, where for some climate cases, the right-most segment boundary 230 may be larger than the normally user-defined parent distribution bounds, e.g. at the 0.001th quantile. Specifically, the segment boundaries 230 (e.g., A and B in FIG. 5) may be functions of a climate-dependent constant (zDdB) from a lookup table, which can be set to infinity or a very large number, e.g., 20 dB. For example, if the upper segment boundary 230 in the right-most segment was set to infinity (or a very large number, e.g., 20 dB), the system 200A may bound the upper segment boundary 230 in the right-most segment 302C.

A segment statistics module 232 may receive the parent mean 226, parent standard deviation 228, and segment boundaries 230 for each segment 302 in a mixture distribution 300 and map the boundaries from probabilities (e.g., 50th percentile) to dBs (e.g., 0 dB) in a log-scale mixture distribution 300, which may be converted to a linear scale (e.g., 1 mW) in a lognormal mixture distribution 400. The segment statistics module 232 may then determine a segment mean 234 and a segment second moment 236 for each segment 502 in a lognormal mixture distribution 400.

For a segment 502 defined by starting point A and ending point B (illustrated in FIG. 5) of a parent lognormal mixture distribution 506, the truncated mean (truncatedMean$_{AB}$, also referred to as the segment mean 234 or first moment) and the truncated second moment (truncated2ndMoment$_{AB}$, also referred to as the segment second moment 236) of the segment 502 may be determined as follows:

$$truncatedMean_{AB} = m * \frac{\Phi(\sigma - \alpha) - \Phi(\sigma - \beta)}{\Phi(\beta) - \Phi(\alpha)}; \text{ and}$$

$$truncated2ndMoment_{AB} = 2ndMoment * \frac{\Phi(2\sigma - \alpha) - \Phi(2\sigma - \beta)}{\Phi(\beta) - \Phi(\alpha)}$$

where $m = \exp\left(u + \frac{\sigma^2}{2}\right) \triangleq$ The parent mean of *lognormal* distribution;

$2ndMoment = \exp(2u + 2\sigma^2)$;

$\alpha = \frac{\ln(A) - u}{\sigma}$;

$\beta = \frac{\ln(B) - u}{\sigma}$; and $\Phi(x) \triangleq$ The value of Standard Normal *CDF* at point *x*; and where u and σ are the mean and standard deviation of parent normal distribution, respectively.

A probability scaler 238 may then determine segment scaled probabilities ($p_i$) for each segment 502. Depending on the use case, values associated with different ranges of probabilities (e.g., in a corresponding cumulative probability function) may be desired. For example, in a first use case, the user may be interested in statistics for generated random receive power samples 333 from the 1th percentile to the 99th percentile. In contrast, in a second use case, the user may be interested in statistics for generated random receive power samples 333 from the 0.01th percentile to the 99.99th percentile.

Accordingly, the probability scaler 238 may receive user input 250 that indicates a parent distribution lowest quantile (parentLeftTailStart), or probability measure corresponding to the lowest observable value of the parent random distribution, e.g. 0.001, or the value corresponding to the 0.01 percentile of the parent normal distribution 506. The user input 250 may also indicate a parent normal distribution 506 highest quantile (parentRightTailEnd), or probability measure corresponding to the highest observable value of the parent random distribution 506, e.g. 0.999, or the value corresponding to the 99.9 percentile of parent normal distribution 506. Alternatively, parentLeftTailStart and parentRightTailEnd may be predefined.

In either case (user input or predefined), this feature allows for defined upper and lower limits on the parent distribution 506, such that statistics are accurately computed for the mixture distribution 300 independent of the specified parent distribution bounds. This may ensure that the probability ranges for the segments 302 in a mixture distribution 300 add up to 100% or 1.0.

A scaled probability (p) may be determined for a segment 502 as the ratio of the probability mass, or area under the curve, of the segment 502 relative to the parent distribution lower bound (parentLeftTailStart) and upper bound (parentRightTailEnd). This may be expressed in the following equation:

$$p_{AB} = \frac{(A) - (B)}{Q(parentRightTailEnd) - Q(parentLeftTailStart)}$$

where A is the upper quantile and B is the lower quantile of the segment 502, and Q(x) is the Q function of a normally distributed random variable with probability x.

A mixture statistics module 242 may determine a mixture mean 244A (mixtureMean) of the mixture distribution as a function of the segment scaled probabilities ($p_i$) 240 and segment means 234, i.e., mixtureMean=f(truncMean$_i$, $p_i$). In other words, the mixture mean 244A (mixtureMean) may be computed by summing the probability-scaled segment means. Specifically, for an n-segment distribution (e.g., in FIG. 3), the mixture mean 244A (mixtureMean) may be determined as follows:

$$mixtureMean = \sum_{i=1}^{n} p_i truncMean_i$$

Where $p_i$ is the segment scaled probability 240 of the ith segment, or the area under the ith segment of the pdf, and truncMean$_i$, is the two-side truncated mean of the ith segment of a given mixture distribution. In other words, the mixture mean 244A (mixtureMean) may be determined by summing each probability-scaled segment mean, where each probability-scaled segment mean is a segment mean 234 scaled by its corresponding scaled probability ($p_i$) 240.

The mixture statistics module 242 may also determine a mixture variance 246A (mixtureVariance) of the mixture distribution as a function of the segment scaled probabilities ($p_i$) 240, segment means 234, and segment second moments ($p_i$) 236 for the segments 502 in the lognormal mixture distribution 400, i.e., mixtureVariance=f(truncMean$_i$, trunc2ndMoment$_i$, $p_i$). The mixture variance 246A (mixtureVariance) may be computed from the difference of (1) the summed probability-scaled segment second moments and (2) the summed probability-scaled segment means. Each probability-scaled segment second moment may be a segment second moment 236 that is scaled by its corresponding scaled probability ($p_i$) 240. Specifically, for an n-segment distribution (e.g., in FIG. 3), the mixture variance 246A (mixtureVariance) may be determined as follows:

$$mixtureVariance = mixture2ndMoment - mixtureMean^2 =$$

$$\sum_{i=1}^{n} p_i trunc2ndMoment_i - \sum_{i=1}^{n} p_i truncMean_i^2$$

where trunc2ndMoment$_i$ is the segment second moment 246A of the ith segment 502 of the mixture distribution pdf.

The mixture standard deviation 248A may be determined from the mixture variance 246A, using a square root module 252, as follows:

$$mixtureStd = \sqrt{mixtureVariance}.$$

In some configurations, if the mixture variance 246A is negative, it may be set to zero. The mixture mean 244A, mixture variance 246A, and mixture standard deviation 248A may be in the linear scale.

FIG. 2B is a block diagram illustrating a system 200B for determining statistics of an aggregate distribution. The system 200B may be implemented using one or more processors executing instructions stored in memory. The system 200B may be physically located in the same computing device(s) as the system 200A illustrated in FIG. 2A, e.g., a SAS 102. The system 200B may receive, as input, the output of the system 200A illustrated in FIG. 2A.

An aggregate distribution may be the sum of multiple lognormal mixture distributions 400, e.g., the sum of a lognormal mixture distribution 400 modeled for each transmitter measured at a protection point. In some configurations, the system 200B may receive mixture means 244B and mixture standard deviations 248B, which are converted to mixture variances 246B, e.g., using a squaring module 254. Alternatively, the system 200B may receive mixture means 244B and mixture variances 246B as input.

Specifically, an aggregate distribution module 256 may determine the mean of the aggregate distribution (i.e., the aggregate linear mean 258) as the linear sum of the (linear) mixture means 244B. Similarly, the aggregate distribution module 256 may determine the variance of the aggregate distribution (i.e., the aggregate linear variance 260) as the linear sum of the (linear) mixture variances 246B. Accordingly, the aggregate linear mean 244B (sumLinearMean) and the aggregate linear variance 260 (sumLinearVariance) may be determined as follows:

$$sumLinearMean = \sum_{j=1}^{N} mixtureMean_j$$

$$sumLinearVariance = \sum_{j=1}^{N} mixtureVariance_j$$

where each mixtureMean$_j$ and mixtureVariance$_j$ may be determined as described above.

A 95th percentile module 262 may then determine a log-scale 95th percentile value 264 of the aggregate distribution that is characterized by the aggregate linear mean 258 and the aggregate linear variance 260. The 95th percentile module 262 may take advantage of the central limit theorem, which stipulates that the sum of N independent random variables converges towards a normal distribution (or bell curve), not a mixture distribution. The log-scale 95th percentile value 264 may be in units of dB or dBm from the median receive power 229 of the mixture distribution 300.

First, using Fenton's 1st moment matching method, the 95th percentile module 262 may convert the aggregate linear mean 258 and the aggregate linear variance 260 to a logarithmic (i.e., $\log_e($ )) scale aggregate mean and a log-scale aggregate variance as follows:

$$sumVarianceLogScale = \log_e\left(\frac{sumLinearVariance}{sumLinearMean^2} + 1\right);$$

$$sumMeanLogScale = \log_e(sumLinearMean) - \frac{sumVarianceLogScale}{2};$$

and $$sumStandardDeviationLogScale = \sqrt{sumVarianceLogScale}.$$

where sumVarianceLogScale, sumMeanLogScale, and sumStandardDeviationLogScale are the log-scale variance, log-scale mean, and log-scale standard deviation of the aggregate normal distribution, respectively.

Second, the 95th percentile module 262 may determine the log-scale 95th percentile value 264 of the aggregate distribution by determining the 95th percentile of a normal distribution with a (log-scale) mean of sumMeanLogScale and a (log-scale) variance of sumVarianceLogScale. Thus, the 95th percentile module 262 may determine the log-scale 95th percentile value 264 as follows:

$$95^{th}percentileLogScale = sumMeanLogScale + sumStandardDeviationLogScale * Q^{-1}(0.05);$$

where $Q^{-1}(0.05)$ is the inverse Q function of a standard normally distributed random variable with probability 0.05, e.g., $Q^{-1}(0.05) \approx 1.6$.

Figure 6:
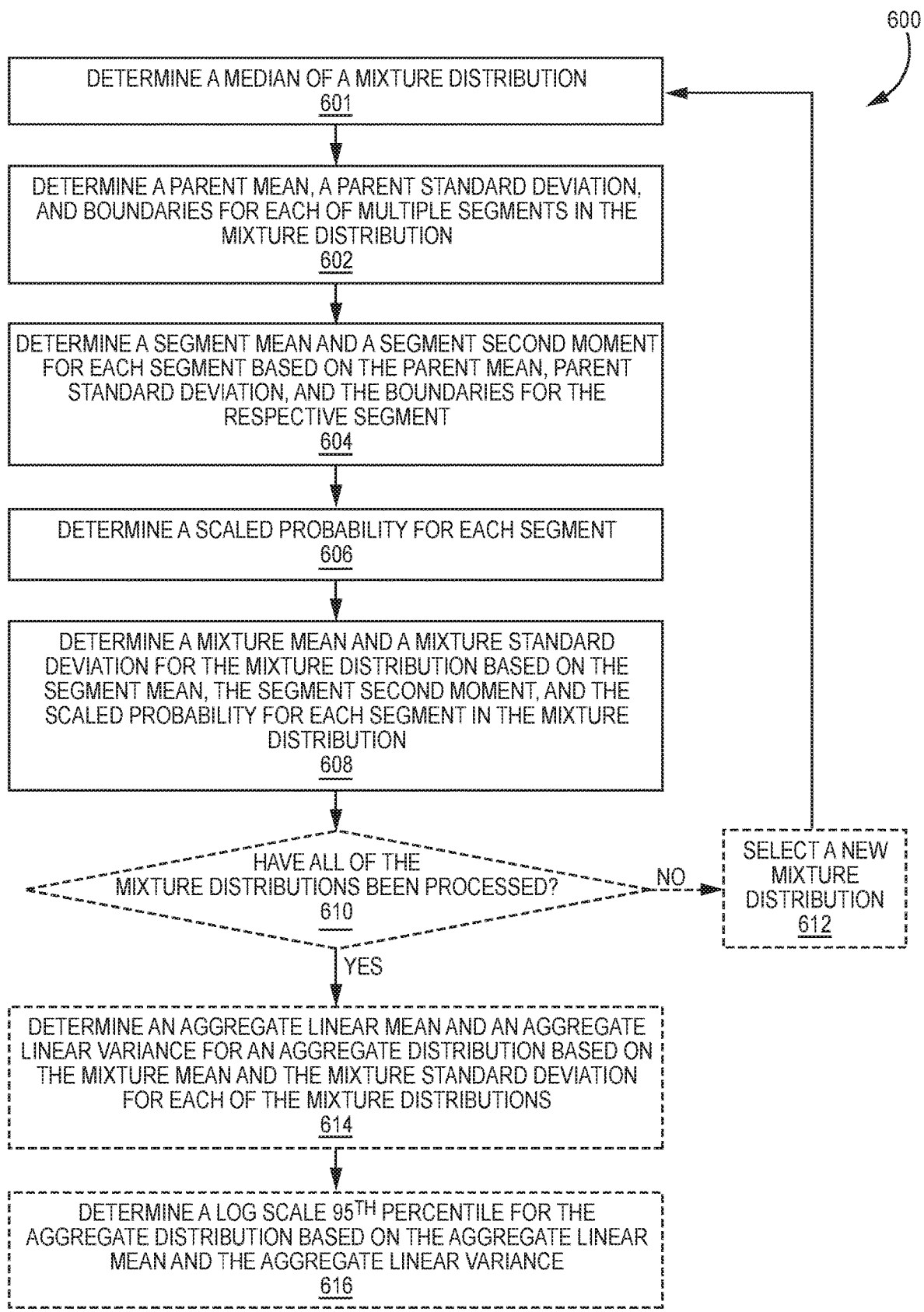
FIG. 6 is a flow diagram illustrating an example method for computing statistics of a mixture distribution.

FIG. 6 is a flow diagram illustrating an example method 600 for computing statistics of a mixture distribution. The method 600 may be performed by a computing device (e.g., a SAS 102 in a CBRS system 100) that includes one or more processors executing instructions stored in memory.

The computing device may determine 601 a median 229 of the mixture distribution, e.g., median receive power. The computing device may also determine 602 a parent mean 226, a parent standard deviation 228, and segment boundaries 230 for each of multiple segments in a mixture distribution, e.g., the mixture distribution may be represented as a log-scale mixture normal distribution 300, a corresponding cumulative probability function, a corresponding probability density function, or a linear-scale lognormal mixture distribution 400. The parent mean 226 and/or the segment boundaries 230 may be determined using the median 229 of the mixture distribution. The median 229 of the mixture distribution, the parent mean 226, parent standard deviation 228, mixture distribution median 229, and segment boundaries 230 for the mixture distribution may be modeled by a mixture distribution modeler 224, e.g., using an ITM model.

The computing device may also determine 604 a segment mean 234 and a segment second moment 236 for each segment (in the mixture distribution) based on the parent mean 226, parent standard deviation 228, mixture distribution median 229, and segment boundaries 230 for the respective segment. This may include computing truncated-Mean$_{AB}$ and truncated2ndMoment$_{AB}$ as described above.

The computing device may also determine 606 segment scaled probabilities 240 for each segment. This may include computing the scaled probability ($p_i$) 240 for each segment based on a ratio of the probability mass, or area under the curve, of the segment relative to the parent distribution lower bound (parentLeftTailStart) and upper bound (parentRightTailEnd), as described above.

The computing device may also determine 608 a mixture mean 244A and a mixture standard deviation 246A for the mixture distribution based on the segment mean 234, the segment second moment 236, and the scaled probability 240 for each segment in the mixture distribution. This may include computing the mixture mean 244A by summing the probability-scaled segment means, where each probability-scaled segment mean is a segment mean 234 that is scaled by its corresponding scaled probability ($p_i$) 240. This may also include computing the mixture variance 246A by computing the difference of (1) the summed probability-scaled segment second moments and (2) the summed probability-scaled segment means, as described above. Each probability-scaled segment second moment (i.e., probability-scaled segment variance) may be a segment second moment 236 that is scaled by its corresponding scaled probability ($p_i$) 240. The mixture standard deviation 248A may be determined by computing the square root of the mixture variance 246A. In some configurations, if the mixture variance 246A is negative, it may be set to zero. The mixture mean 244A and the mixture standard deviation 246A may be in the linear scale.

Optionally, the computing device may determine 610 whether all the mixture distributions have been processed. If not, the computing system may optionally select 612 a new mixture distribution (i.e., a mixture distribution for which statistics need to be computed) and return to step 602.

If all the mixture distributions have been processed (i.e., there are no more mixture distributions for which statistics need to be computed), the computing device may optionally determine 614 an aggregate linear mean 258 and an aggregate linear variance 260 for an aggregate distribution based on the mixture mean 244A and the mixture standard deviation 246A for each of the mixture distributions, as described above. This may include computing the aggregate linear mean 258 as the linear sum of the (linear) mixture means 244B. This may also include computing the aggregate linear variance 260 as the linear sum of the (linear) mixture variances 246B, as described above.

The computing device may optionally determine 616 a log-scale 95th percentile value 264 for the aggregate distribution based on the aggregate linear mean 258 and the aggregate linear variance 260. This may include (1) converting the aggregate linear mean 258 to a log-scale mean (sumMeanLogScale) and the aggregate linear variance 260 to a log-scale variance (sumVarianceLogScale); and (2) computing the log-scale 95th percentile value 264 of the aggregate distribution by determining the 95th percentile of a normal distribution with a (log-scale) mean of sumMeanLogScale and a (log-scale) variance of sumVarianceLogScale. The log-scale 95th percentile value 264 may be in units of dBm.

If performed by a SAS 102 to model path loss in a wireless system 100, the method 600 may result in more accurate (i.e., with less variation) path loss modeling compared to other techniques of computing similar statistics. The method 600 may also reduce the processing and memory demands required by a computing device (e.g., a SAS) modeling path loss in a wireless system compared to other techniques of computing similar statistics.

For example, in a CBRS system 100, a mixture distribution may be modeled for each transmitter that is received at (i.e., with a signal that can be detected at) a protection point. In some configurations, mixture distributions may only be modeled for secondary users (i.e., Priority Access Licensees (PAL) and General Authorized Access (GAA) users) within a detectable range of the protection point. Alternatively, mixture distributions may be modeled for every CBSD 108 with a signal received at the protection point. A SAS 102 may determine an aggregate distribution of the mixture distributions for the transmitters with signals received at the protection point, or across transmitters with signals received at multiple protection points.

The SAS may then determine the 95th percentile of the aggregate distribution to identify a subset of look angles with maximum likelihood of having the highest interference level. The transmitters (e.g., secondary users) associated with this subset of look angles may be added to a Move-List of secondary users that are removed from the channel (e.g., instructed to cease (or prevented from) transmitting on a particular communication channel (or frequency) for at least a period of time) in order to protect incumbents (i.e., Tier 1 users) on the channel. For example, the 95th percentile of the aggregate distribution may be used to determine a set of secondary users to remove from the channel (i.e., a Move-List) such that a RADAR receiver is protected from aggregate interference from CBSDs 108 in the full 360 degree view of the RADAR receiver.

Alternatively, the 95th percentile of the aggregate distribution may be used to protect Tier 2 operators (Priority Access Licensees (PAL)) from Tier 3 (GAA) interference, e.g., to identify a subset of Tier 3 (GAA) users to remove from the channel in order to protect Tier 2 operators (PAL). Alternatively, the 95th percentile of the aggregate distribution may be used to protect Tier 3 operators (GAA) from Tier 3 (GAA) interference, e.g., to identify a subset of Tier 3 (GAA) users to remove from the channel in order to protect other Tier 3 user(s) (GAA). Alternatively, the 95th percentile of the aggregate distribution may be used to protect Tier 2 operators (PAL) from Tier 2 (PAL) and Tier 3 (GAA) interference, e.g., to identify a subset of Tier 2 operators (PAL) and Tier 3 (GAA) users to remove from the channel in order to protect other Tier 2 operators (PAL).

Figure 7A:
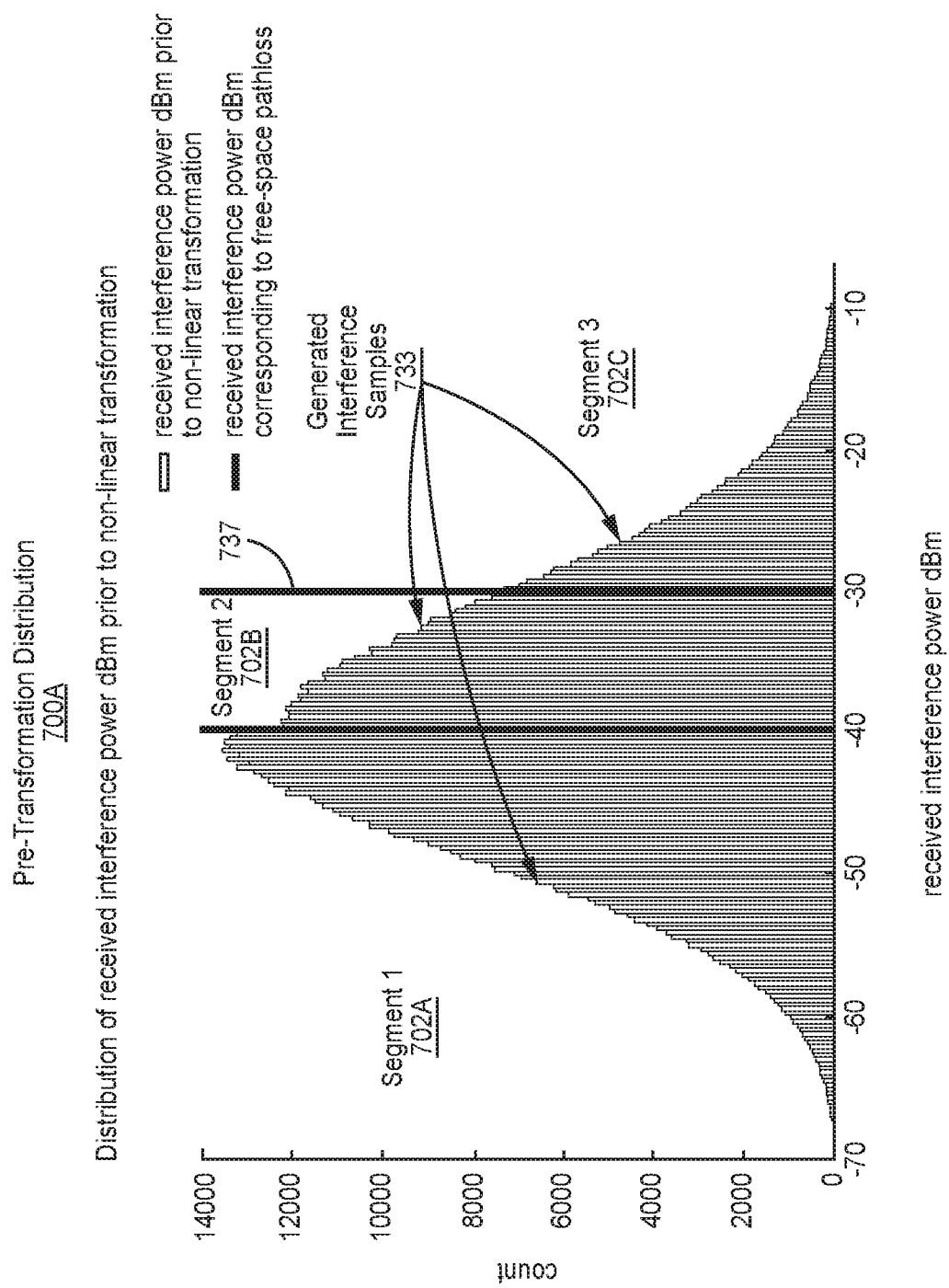
FIG. 7A is a log-scale distribution illustrating an example pre-transformation distribution of received interference power dBm prior to a non-linear transformation.

FIG. 7A is a log-scale distribution illustrating an example pre-transformation distribution 700A of received interference power dBm prior to a non-linear transformation. For example, the example pre-transformation distribution 700A illustrated in FIG. 7A may be a generated by a Monte Carlo simulation. The pre-transformation distribution 700A models interference power of generated samples and is, therefore, similar (but not identical) to the mixture normal distribution 300 of FIG. 3 that models receive power of generated receive power samples.

The pre-transformation distribution 700A may be a probability log-scale distribution including multiple segments 702, each segment having a different mean and/or variance. Each segment 702 may be a portion of a parent distribution (e.g., normal distribution) where each parent distribution has a different shape caused by its mean and variance. Because each parent distribution has a different mean and/or variance, the pre-transformation distribution 700A may be disjoint at segment 702 transitions. The pre-transformation distribution 700A may include more or less than three segments 702, e.g., two, four, etc. Specifically, as shown in FIG. 7A, a first segment 702A may include interference samples from −70 dBm to −40 dBm; a second segment 702B may include interference samples from −40 dBm to −30 dBm; and a third segment 702C may include interference samples from −30 dBm to around −10 dBm.

The pre-transformation distribution 700A may be thought of as a distribution of a random variable X. The pre-transformation distribution 700A may illustrate the distribution of received interference power from a particular transmitter in a CBRS system 100, i.e., based on generated or computed (not measured) receive power samples. For example, the pre-transformation distribution 700A may include an interference power value across a range of reliability values. The ITM propagation model generates time variation of pathloss as a function of the input reliability, which is represented by a quantile, such as 0.01, therefore it ranges from 0 to 1. Since this quantile is an RF link reliability measure, higher quantile values produce higher ITM pathloss values, and vis versa. Therefore, the received interference power time variation, which is inversely proportional to pathloss, will vary such that lower quantile values correspond to higher interference power values in the interference power distribution. This creates a complementary nature of the received interference power distribution plot, with the right-tail corresponding to lowest quantiles and vis versa. Therefore, the pre-transformation distribution 700A may be referred to as an interference power distribution.

The example of a Monte-Carlo-simulation-generated pre-transformation distribution 700A illustrated in FIG. 7A is in log-scale in order to compress a large variation of generated samples 733 of receive interference power into a single distribution. Therefore, the x axis of the pre-transformation distribution 700A may represent decibels (dB) from a median receive power 229, in dBm, (i.e., interference power variation), which may also map to percentiles of a corresponding cumulative probability function. For example, −40 dBm on the x axis may map to approximately 50% (or 0.5) in a cumulative probability function, i.e., the interference power associated with approximately the lower 50% of the generated receive power samples are equal to or less than −40 dBm. Similarly, −60 dBm on the x axis may map to approximately 5% (or 0.05) in a cumulative probability function, i.e., the interference power associated with approximately 5% of the generated receive power samples are at 20 dB below the median receive power (at −40 dBm).

The y axis of the pre-transformation distribution 700A may represent the number of generated receive interference samples 733 for a particular power variation bin, e.g., approximately 7,000 receive interference samples 733 were generated for a particular transmitter that were 10 dB below the median receive power for the particular transmitter, as illustrated in FIG. 7A. Similarly, approximately 4,000 receive interference samples 733 were generated for a particular transmitter that were 15 dB above the median receive power for the particular transmitter, as illustrated in FIG. 7A.

The y axis of the pre-transformation distribution 700A may represent the number of generated receive interference samples 733A for a particular power variation bin, e.g., approximately 7,000 receive interference samples 733A were generated for a particular transmitter that were 10 dB below the median receive power for the particular transmitter, as illustrated in FIG. 7. Similarly, approximately 4,000 receive interference samples 733A were generated for a particular transmitter that were 15 dB above the median receive power for the particular transmitter, as illustrated in FIG. 7.

Under certain combination(s) of RF conditions, terrain, geometry, climate and statistics of pathloss variation, the ITM model may subject a subset of the Monte Carlo population to a nonlinear transformation function ($f_{NL}$) to reduce interference power variation so it doesn't exceed much beyond a power level corresponding to free space pathloss 737. Therefore, the computation of the statistics of the mixture distribution of interference power should ideally account for this if it is triggered by the ITM model. FIG. 7A illustrates the receive interference power distribution 700A before applying non-linear transformation of a subset, or subsegment, of the interference power distribution. As shown in FIG. 7A, −30 dBm represents the received power dBm corresponding to free-space pathloss 737.

Figure 7B:
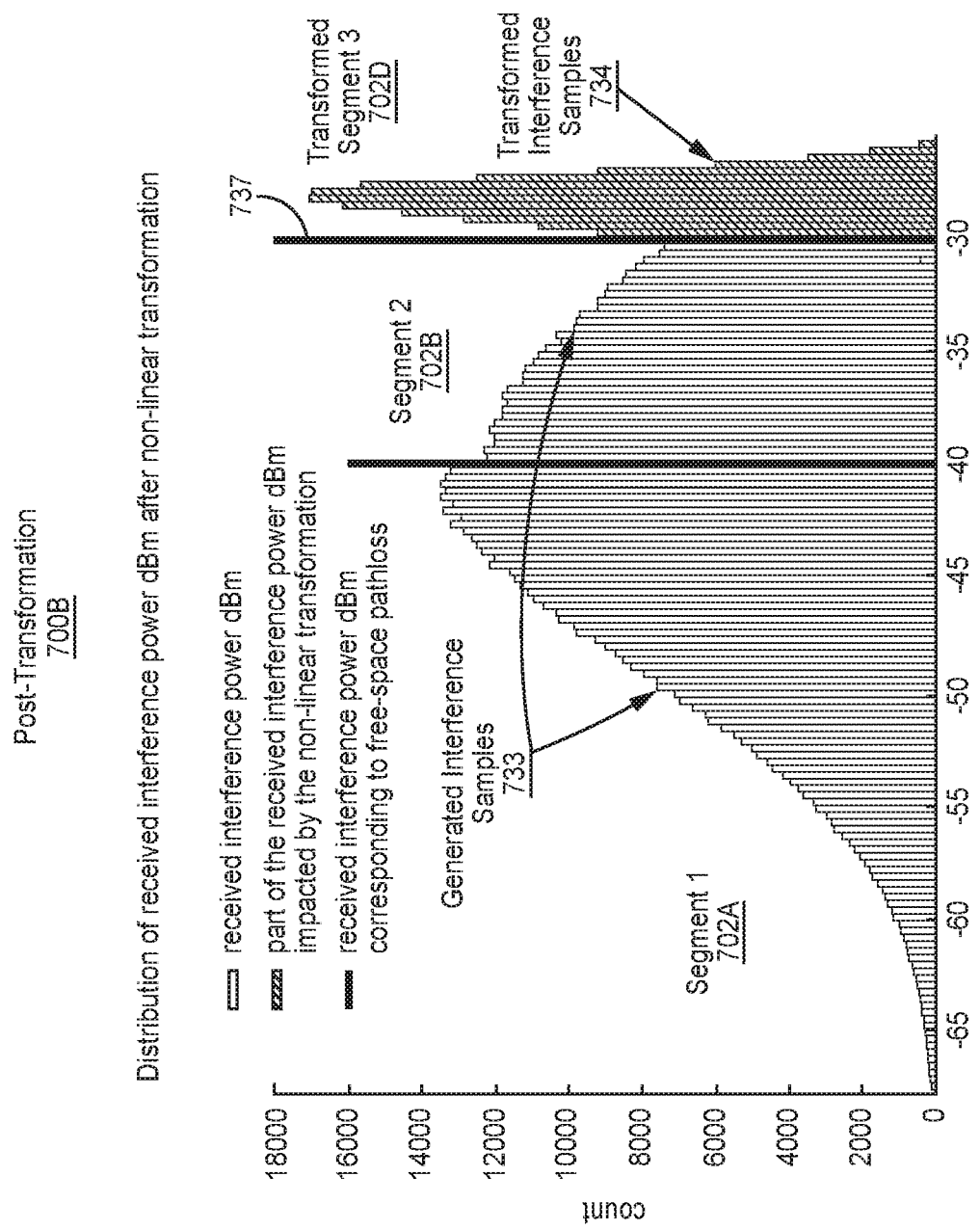
FIG. 7B illustrates the receive interference power distribution after non-linear transformation of a subset, or sub-segment, of the interference power distribution.

FIG. 7B illustrates the receive interference power distribution 700B after non-linear transformation of a subset, or subsegment, of the interference power distribution. In other words, FIG. 7B illustrates a post-transformation distribution 700B. Specifically, as shown in the key, the generated interference samples 733 in the first segment 702A and the second segment 702B represent distribution of interference power before a non-linear transformation, e.g., as in FIG. 7A. However, the transformed interference samples 734 in transformed segment 3 702D represent distribution of interference power after the non-linear transformation. As before, −30 dBm represents the received power dBm corresponding to free-space pathloss 737 in FIG. 7B.

Figure 8:
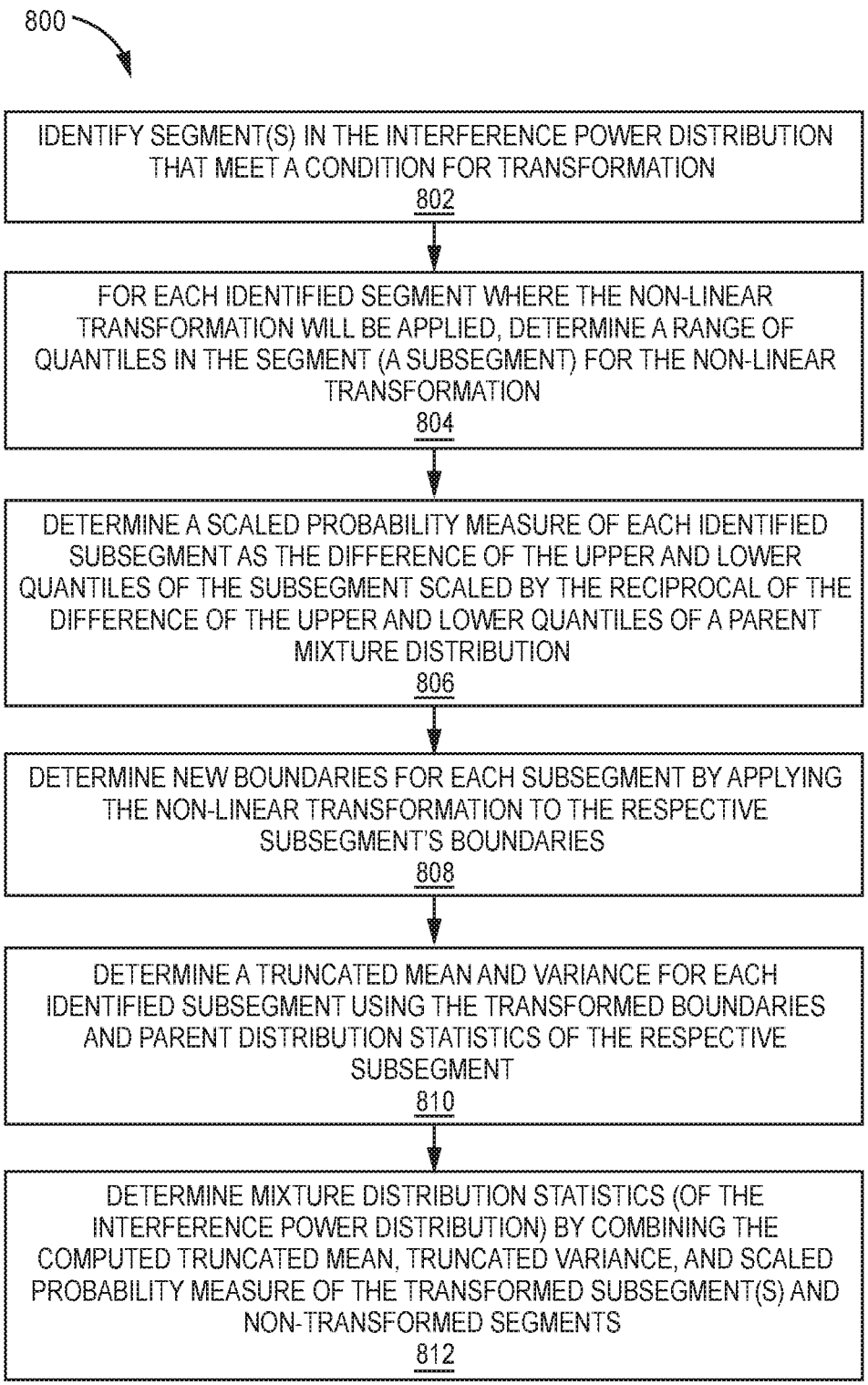
FIG. 8 is a flow diagram illustrating an example method for computing statistics of a mixture distribution in order to account for the possible occurrence of the non-linear transformation.

FIG. 8 is a flow diagram illustrating an example method 800 for computing statistics of a mixture distribution in order to account for the possible occurrence of the non-linear transformation, e.g., as illustrated in FIG. 7B. The method 800 may be performed by a computing device (e.g., a SAS 102 in a CBRS system 100) that includes one or more processors executing instructions stored in memory.

The computing device may determine if a segment 702 of an interference power distribution 700 (e.g., an interference distribution or interference power distribution) will be subject to a non-linear transformation function ($f_{NL}$), e.g., by using ITM radio frequency (RF) parameters. The ITM RF parameters may be based on terrain, geometry and climate in relation to the statistics of a parent distribution for the segment 702. The non-linear transformation function may be a non-linear function that limits the variation of interference power in the interference power distribution 700. For example, Equation (5.2) in "The ITS Irregular Terrain Model, version 1.2.2: The Algorithm" by George Hufford (available at https://www.its.bldrdoc.gov/media/50676/it-m_alg.pdf) is an example of a non-linear transformation function ($f_{NL}$) that may be used herein.

The computing device may identify 802 segment(s) 702 in the interference power distribution 700A (RxInterfPwr (q)) that meet a condition for non-linear transformation. This may include determining if the interference power will be above the level corresponding to free space pathloss 737 at any quantile within a segment of the interference power distribution, RxInterfPwr(q). This determination may be made as follows.

First, the equation for total ITM pathloss may be given as follows:

$$PL_{Total}(q) = PL_{FS} + PL(q)_{ITM}$$

where $PL_{FS}$ is the free space pathloss in dB, and $PL(q)_{ITM}$ is the basic ITM predicted path loss at the qth quantile in dB.

Second, the received interference power at the qth quantile (of the RxInterfPwr distribution) is given by the equation:

$$RxInterfPwr(q) = EIRP + RxGain - PL_{Total}(q)$$

Where EIRP in (dBm) is effective isotropic radiated power in (dBm) and RxGain in (dB) is the receive gain based on receive antenna gain pattern. Combining the first two terms of the equation into a single term, InterfPowerNoPL, we rewrite the equation as:

$$RxInterfPwr(q) = InterfPowerNoPL - PL_{Total}(q)$$

Third, substituting $PL_{Total}(q)$ as shown in the first step above, the equation in the second step above may be rewritten as:

$$RxInterfPwr(q) = InterfPowerNoPL - PL_{FS} - PL(q)_{ITM}$$

Fourth, combining the first two terms in equation from the third step into a single term, which corresponds to the received interference power component due to free space pathloss 737, $InterfPowerPL_{FS} = InterfPowerNoPL - PL_{FS}$, we have the following equation:

$$RxInterfPwr(q) = InterfPowerPL_{FS} - PL(q)_{ITM}$$

Based on the equation in the fourth step, the criterion for RxInterfPwr(q) to not exceed $InterfPowerPL_{FS}$ is $PL(q)_{ITM} \geq 0$ for all quantiles. For a given segment 702 in the RxInterfPwr(q) distribution, it is sufficient to check if the inequality is true only at the lowest value of $PL(q)_{ITM}$, which in ITM model corresponds to the lowest quantile, a $q_{lowest}$, which (as explained in above) occurs at the right-most tail end of the interference power distribution for that segment 702. For example, if a $q_{lowest}=0.01$ is the lowest quantile of the segment 702, then if $PL(0.01)_{ITM} \geq 0$, then it means that RxInterfPwr(q) will not be greater than $InterfPowerPL_{FS}$ for all other quantiles $q > q_{lowest}$, and no non-linear transformation will be necessary at any other quantile. Otherwise, if $PL(q_{lowest})_{ITM} < 0$ then for at least one segment within the RxInterfPwr(q) distribution RxInterfPwr(q) will be greater than $InterfPowerPL_{FS}$, and hence non-linear transformation will be necessary. In other words, the non-linear transformation may be applied to the third segment 702C in FIG. 7A because it is greater than $InterfPowerPL_{FS}$ (e.g., −30 dBm) of the pre-transformation distribution 700A.

FIG. 7A-7B illustrate this concept. Specifically, the basic ITM predicted path loss at the lowest quantile in dB ($PL(q_{lowest})_{ITM}$) of the third segment 702C in FIG. 7A is less than 0. Accordingly, the third segment 702C would be identified in step 802 as meeting the condition for non-linear transformation (e.g., resulting in the transformed segment 702D in FIG. 7B).

The computing device may also, for each identified segment 702C where the non-linear transformation ($f_{NL}$) will be applied, determine 804 a range of quantiles in the segment 702C for the non-linear transformation. Each set of these bounds (upper and lower) defines a subsegment in the interference power distribution 700 where the ITM would apply a non-linear transformation to limit the predicted power variation. The lower quantile ($q_{lower}$) of the subsegment is simply the lowest quantile of the respective segment 702C that was used in the prior step (e.g., step 802) to identify the need for non-linear transformation, e.g., for a subsegment $q_{lower} = q_{lowest}$, where $q_{lowest}$ was determined in step 802. As for the upper quantile ($q_{NLUpper}$) of the subsegment, it is determined by solving for the quantile (q) that satisfies the equation $PL(q)_{ITM} = 0$. To that end, the ITM predicted path loss ($PL(q)_{ITM}$) for q quantiles of respective segment may be expressed as the variation around the basic ITM median pathloss, e.g., pathloss at quantile q=0.5, or $PL(0.5)_{ITM}$, where the variation is normally distributed with a mean ($u_{Parent}$) and standard deviation ($\sigma_{Parent}$). Recall that each segment within the ITM interference power MD has an ITM parent mean and standard deviation. Therefore, the distribution of ITM basic pathloss for given segment is $PL_{ITM} \sim N(PL(0.5)_{ITM} - u_{Parent}, \sigma_{Parent})$. Thus, for a given segment and a given quantile q within the segment, the equation for ITM basic pathloss is $PL(q)_{ITM} = PL(0.5)_{ITM} - (u_{Parent} + \sigma_{Parent} * Q^{-1}(q))$ Setting the expanded equation to zero will allow for solving for quantile a $q_{NLUpper}$ as follows:

$$PL(0.5)_{ITM} - (u_{Parent} + \sigma_{Parent} * Q^{-1}(q_{NLUpper})) = 0$$

$$PL(0.5)_{ITM} = (u_{Parent} + \sigma_{Parent} * Q^{-1}(q_{NLUpper}))$$

$$PL(0.5)_{ITM} - u_{Parent} = \sigma_{Parent} * Q^{-1}(q_{NLUpper}))$$

$$\sigma_{Parent}*Q^{-1}(q_{NLUpper}))=PL(0.5)_{ITM}-u_{Parent}$$

$$Q^{-1}(q_{NLUpper}))=PL(0.5)_{ITM}-u_{Parent})/\sigma_{Parent}$$

After applying the Q function to both sides of this equation, a closed form expression for the quantile (q) is as follows:

$$q_{NLUpper} = Q\left(\frac{PL(0.5)_{ITM} - u_{Parent}}{\sigma_{Parent}}\right)$$

The computing device may also determine 806 a scaled probability measure (e.g., as described in par. [0069] above) of each identified subsegment (from step 804) as the difference of the upper and lower quantiles of the subsegment scaled by the reciprocal of the difference of the upper and lower quantiles of the parent mixture distribution, as follows:

$$p_{transformedSegment} = \frac{q_{NLUpper} - q_{lower}}{Q(parentRightTailEnd) - Q(parentLeftTailStart)))}$$

The computing device may also determine 808 new boundaries for each subsegment by applying the non-linear transformation function ($f_{NL}$) to the respective subsegment's boundaries as follows:

$$Rx\text{InterfPwr}_{TransformedUpper}(q_{NLUpper})=\text{InterfPower-}PL_{FS}-f_{NL}(PL(q_{NLUpper})_{ITM}); \text{ and}$$

$$Rx\text{InterfPwr}_{TransformedLower}(q_{NLlower})=\text{InterfPower-}PL_{FS}-f_{NL}(PL(q_{NLlower})_{ITM})$$

As mentioned above, Equation (5.2) in "The ITS Irregular Terrain Model, version 1.2.2: The Algorithm" may be used to define the non-linear transformation function ($f_{NL}$) as:

$$f_{NL}(PL(q)_{ITM}) = \frac{29*PL(q)_{ITM} - PL(q)^2_{ITM}}{29 - 10*PL(q)_{ITM}}$$

where q is the quantile, such as a $q_{NLUpper}$ or $q_{NLUpper}$, where the transformation is to be applied and $PL(q)_{ITM}$ is the basic ITM predicted path loss at the quantile q in dB. This function will always return a value that is less negative than its input variable, i.e. $f_{NL}(PL(q)_{ITM}) \geq PL(q)_{ITM}$ for all values of $PL(q)_{ITM} \leq 0$.

The computing device may also determine 810 the truncated mean and variance of the subsegment(s) using the transformed boundaries and parent distribution statistics of the subsegment(s), as described above, e.g., in pars. [0063]-[0065].

The computing device may also determine 812 the mixture distribution statistics (of the interference power distribution 700) by combining the computed truncated mean, truncated variance and scaled probability measure(s) (from step 806) of transformed subsegment(s) and non-transformed segments. For example, the computing device may determine an aggregate mean, aggregate variance, and/or 95th percentile of the aggregate interference from a set of transmitters based on the truncated mean, truncated variance and probability measure of the transformed subsegment(s) 702C as well as the non-transformed segments 702A-B. Step 812 may be similar to step 608 above.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like. The term "computing" may be used interchangeably with "determining" herein.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for computing statistics for mixture distributions. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a computing device for computing statistics for a first mixture distribution, comprising: a processor; memory in electronic communication with the processor; and instructions stored in memory, the instructions being executable to: determine a median of the first mixture distribution; determine a parent mean, a parent standard deviation, and boundaries for each of multiple segments in the first mixture distribution; determine a segment mean and a segment second moment for each segment based on the parent mean, the parent standard deviation, and the boundaries for the respective segment; determine a scaled probability for each segment; and determine a mixture mean and a mixture standard deviation for the first mixture distribution based on the segment mean, the segment second moment, and the scaled probability for each segment in the first mixture distribution.

Example 2 includes the computing device of Example 1, wherein the median of the first mixture distribution and the parent mean, the parent standard deviation, and the boundaries for each of the segments are determined using an irregular terrain model (ITM).

Example 3 includes the computing device of any of Examples 1-2, wherein the scaled probability for a particular segment is determined based on a ratio of an area under the curve of the particular segment relative to a parent distribution lower bound and a parent distribution upper bound.

Example 4 includes the computing device of any of Examples 1-3, wherein the instructions being executable to determine the mixture mean and the mixture standard deviation comprise instructions being executable to: determine the mixture mean by summing a plurality of probability-scaled segment means, wherein each probability-scaled segment mean is a segment mean scaled by its corresponding scaled probability.

Example 5 includes the computing device of Example 4, wherein the instructions being executable to determine the mixture mean and the mixture standard deviation further comprise instructions being executable to: determine a mixture variance by computing a difference of a summed plurality of probability-scaled segment second moments and the summed probability-scaled segment means.

Example 6 includes the computing device of any of Examples 1-5, further comprising instructions being executable to: determine a mixture mean and a mixture standard deviation for each of a plurality of other mixture distributions; determine an aggregate linear mean and an aggregate linear variance for an aggregate distribution based on the mixture means and the mixture standard variations for the first and other mixture distributions; and determine a log-scale 95th percentile value for the aggregate distribution based on the aggregate linear mean and the aggregate linear variance.

Example 7 includes the computing device of Example 6, wherein the instructions being executable to determine the aggregate linear mean and the aggregate linear variance comprise instructions being executable to: determine the aggregate linear mean as the linear sum of the mixture means; and determine the aggregate linear variance as the linear sum of the mixture variances.

Example 8 includes the computing device of any of Examples 6-7, wherein the instructions being executable to determine the aggregate linear mean and the aggregate linear variance comprise instructions being executable to: convert the aggregate linear mean to a log-scale mean; convert the aggregate linear variance to a log-scale variance; and determine the log-scale 95th percentile value by determining a 95th percentile value of a normal distribution with a mean of the log-scale mean and a variance of the log-scale variance.

Example 9 includes the computing device of any of Examples 6-8, wherein the computing device is a spectrum access system (SAS) in a Citizens Broadband Radio Service (CBRS) system.

Example 10 includes the computing device of Example 9, wherein the SAS uses the log-scale 95th percentile value for the aggregate distribution to determine a subset of Citizens Broadband Radio Service devices (CBSDs) to remove from a communication channel.

Example 11 includes a method for computing statistics for a first mixture distribution, comprising: determining a median of the first mixture distribution; determining a parent mean, a parent standard deviation, and boundaries for each of multiple segments in the first mixture distribution; determining a segment mean and a segment second moment for each segment based on the parent mean, the parent standard deviation, and the boundaries for the respective segment; determining a scaled probability for each segment; and determining a mixture mean and a mixture standard deviation for the first mixture distribution based on the segment mean, the segment second moment, and the scaled probability for each segment in the first mixture distribution.

Example 12 includes the method of Example 11, wherein the median of the first mixture distribution and the parent mean, the parent standard deviation, and the boundaries for each of the segments are determined using an irregular terrain model (ITM).

Example 13 includes the method of any of Examples 11-12, wherein the scaled probability for a particular segment is determined based on a ratio of an area under the curve of the particular segment relative to a parent distribution lower bound and a parent distribution upper bound.

Example 14 includes the method of any of Examples 11-13, wherein the determining the mixture mean and the mixture standard deviation comprises: determining the mixture mean by summing a plurality of probability-scaled segment means, wherein each probability-scaled segment mean is a segment mean scaled by its corresponding scaled probability.

Example 15 includes the method of Example 14, wherein determining the mixture mean and the mixture standard deviation further comprises: determining a mixture variance by computing a difference of a summed plurality of probability-scaled segment second moments and the summed probability-scaled segment means.

Example 16 includes the method of any of Examples 11-15, further comprising: determining a mixture mean and a mixture standard deviation for each of a plurality of other mixture distributions; determining an aggregate linear mean and an aggregate linear variance for an aggregate distribution based on the mixture means and the mixture standard variations for the first and other mixture distributions; and determining a log-scale 95th percentile value for the aggregate distribution based on the aggregate linear mean and the aggregate linear variance.

Example 17 includes the method of Example 16, wherein determining the aggregate linear mean and the aggregate linear variance comprises: determining the aggregate linear mean as the linear sum of the mixture means; and determining the aggregate linear variance as the linear sum of the mixture variances.

Example 18 includes the method of any of Examples 16-17, wherein determining the aggregate linear mean and the aggregate linear variance comprises: converting the aggregate linear mean to a log-scale mean; converting the aggregate linear variance to a log-scale variance; and determining the log-scale 95th percentile value by determining a 95th percentile value of a normal distribution with a mean of the log-scale mean and a variance of the log-scale variance.

Example 19 includes the method of any of Examples 16-18, wherein the method is performed by a spectrum access system (SAS) in a Citizens Broadband Radio Service (CBRS) system.

Example 20 includes the method of Example 19, wherein the SAS uses the log-scale 95th percentile value for the aggregate distribution to determine a subset of Citizens Broadband Radio Service devices (CBSDs) to remove from a communication channel.

The invention claimed is:

1. A computing device for computing statistics for a first mixture distribution, comprising:
    a processor;
    memory in electronic communication with the processor; and
    instructions stored in a memory, the instructions being executable to:
        determine a median of the first mixture distribution;
        determine a parent mean, a parent standard deviation, and boundaries for each of multiple segments in the first mixture distribution;
        determine a segment mean and a segment second moment for each segment based on the parent mean, the parent standard deviation, and the boundaries for the respective segment;
        determine a scaled probability for each segment; and
        determine a mixture mean and a mixture standard deviation for the first mixture distribution based on the segment mean, the segment second moment, and the scaled probability for each segment in the first mixture distribution.

2. The computing device of claim 1, wherein the median of the first mixture distribution and the parent mean, the parent standard deviation, and the boundaries for each of the segments are determined using an irregular terrain model (ITM).

3. The computing device of claim 1, wherein the scaled probability for a particular segment is determined based on a ratio of an area under a curve of the particular segment relative to a parent distribution lower bound and a parent distribution upper bound.

4. The computing device of claim 1, wherein the instructions being executable to determine the mixture mean and the mixture standard deviation comprise instructions being executable to:
    determine the mixture mean by summing a plurality of probability-scaled segment means, wherein each probability-scaled segment mean is a segment mean scaled by its corresponding scaled probability.

5. The computing device of claim 4, wherein the instructions being executable to determine the mixture mean and the mixture standard deviation further comprise instructions being executable to:
    determine a mixture variance by computing a difference of a summed plurality of probability-scaled segment second moments and the summed probability-scaled segment means.

6. The computing device of claim 1, further comprising instructions being executable to:
    determine a mixture mean and a mixture standard deviation for each of a plurality of other mixture distributions;
    determine an aggregate linear mean and an aggregate linear variance for an aggregate distribution based on the mixture means and the mixture standard variations for the first and other mixture distributions; and
    determine a log-scale 95th percentile value for the aggregate distribution based on the aggregate linear mean and the aggregate linear variance.

7. The computing device of claim 6, wherein the instructions being executable to determine the aggregate linear mean and the aggregate linear variance comprise instructions being executable to:
    determine the aggregate linear mean as a linear sum of the mixture means; and
    determine the aggregate linear variance as the linear sum of the mixture variances.

8. The computing device of claim 6, wherein the instructions being executable to determine the aggregate linear mean and the aggregate linear variance comprise instructions being executable to:
    convert the aggregate linear mean to a log-scale mean;
    convert the aggregate linear variance to a log-scale variance; and
    determine the log-scale 95th percentile value by determining a 95th percentile value of a normal distribution with a mean of the log-scale mean and a variance of the log-scale variance.

9. The computing device of claim 6, wherein the computing device is a spectrum access system (SAS) in a Citizens Broadband Radio Service (CBRS) system.

10. The computing device of claim 9, wherein the SAS uses the log-scale 95th percentile value for the aggregate distribution to determine a subset of Citizens Broadband Radio Service devices (CBSDs) to remove from a communication channel.

11. A method for computing statistics for a first mixture distribution, comprising:
    determining a median of the first mixture distribution;
    determining a parent mean, a parent standard deviation, and boundaries for each of multiple segments in the first mixture distribution;
    determining a segment mean and a segment second moment for each segment based on the parent mean, the parent standard deviation, and the boundaries for the respective segment;

determining a scaled probability for each segment; and determining a mixture mean and a mixture standard deviation for the first mixture distribution based on the segment mean, the segment second moment, and the scaled probability for each segment in the first mixture distribution.

12. The method of claim 11, wherein the median of the first mixture distribution and the parent mean, the parent standard deviation, and the boundaries for each of the segments are determined using an irregular terrain model (ITM).

13. The method of claim 11, wherein the scaled probability for a particular segment is determined based on a ratio of an area under a curve of the particular segment relative to a parent distribution lower bound and a parent distribution upper bound.

14. The method of claim 11, wherein the determining the mixture mean and the mixture standard deviation comprises:

determining the mixture mean by summing a plurality of probability-scaled segment means, wherein each probability-scaled segment mean is a segment mean scaled by its corresponding scaled probability.

15. The method of claim 14, wherein determining the mixture mean and the mixture standard deviation further comprises:

determining a mixture variance by computing a difference of a summed plurality of probability-scaled segment second moments and the summed probability-scaled segment means.

16. The method of claim 11, further comprising:

determining a mixture mean and a mixture standard deviation for each of a plurality of other mixture distributions;

determining an aggregate linear mean and an aggregate linear variance for an aggregate distribution based on the mixture means and the mixture standard variations for the first and other mixture distributions; and determining a log-scale 95th percentile value for the aggregate distribution based on the aggregate linear mean and the aggregate linear variance.

17. The method of claim 16, wherein determining the aggregate linear mean and the aggregate linear variance comprises:

determining the aggregate linear mean as a linear sum of the mixture means; and determining the aggregate linear variance as the linear sum of the mixture variances.

18. The method of claim 16, wherein determining the aggregate linear mean and the aggregate linear variance comprises:

converting the aggregate linear mean to a log-scale mean;

converting the aggregate linear variance to a log-scale variance; and determining the log-scale 95th percentile value by determining a 95th percentile value of a normal distribution with a mean of the log-scale mean and a variance of the log-scale variance.

19. The method of claim 16, wherein the method is performed by a spectrum access system (SAS) in a Citizens Broadband Radio Service (CBRS) system.

20. The method of claim 19, wherein the SAS uses the log-scale 95th percentile value for the aggregate distribution to determine a subset of Citizens Broadband Radio Service devices (CBSDs) to remove from a communication channel.

* * * * *